United States Patent
Agrawal et al.

(10) Patent No.: US 11,657,398 B2
(45) Date of Patent: May 23, 2023

(54) METHODS AND SYSTEMS FOR PATTERN-BASED AUTHENTICATION FOR PAYMENT TRANSACTIONS

(71) Applicant: MASTERCARD INTERNATIONAL INCORPORATED, Purchase, NY (US)

(72) Inventors: Rahul Agrawal, Maharashtra (IN); Sudhir Gupta, Maharashtra (IN); Harsh Piparsaniya, Maharashtra (IN)

(73) Assignee: Mastercard International Incorporated, Purchase, NY (US)

( * ) Notice: Subject to any disclaimer, the term of this patent is extended or adjusted under 35 U.S.C. 154(b) by 115 days.

(21) Appl. No.: 17/000,573

(22) Filed: Aug. 24, 2020

(65) Prior Publication Data

US 2021/0065184 A1 Mar. 4, 2021

(30) Foreign Application Priority Data

Sep. 4, 2019 (SG) .............................. 10201908143R

(51) Int. Cl.
*G06Q 20/40* (2012.01)
*G06Q 20/38* (2012.01)

(52) U.S. Cl.
CPC ....... *G06Q 20/4012* (2013.01); *G06Q 20/382* (2013.01); *G06Q 20/40145* (2013.01)

(58) Field of Classification Search
None
See application file for complete search history.

(56) References Cited

U.S. PATENT DOCUMENTS

| 8,006,096 | B2* | 8/2011 | Oda | G06F 21/31 713/184 |
| 10,360,561 | B2* | 7/2019 | Poon | G06Q 20/32 |
| 2011/0055585 | A1* | 3/2011 | Lee | H04L 9/3218 713/183 |
| 2014/0047525 | A1* | 2/2014 | Bonhoff | G06F 21/31 726/7 |
| 2014/0168716 | A1* | 6/2014 | King | G06V 30/416 358/473 |
| 2015/0324830 | A1* | 11/2015 | Chandrasekaran | G06Q 30/0226 705/14.27 |
| 2018/0314816 | A1* | 11/2018 | Turgeman | G06F 21/40 |
| 2019/0197522 | A1* | 6/2019 | Jangid | G06Q 20/3674 |

\* cited by examiner

*Primary Examiner* — Chrystina E Zelaskiewicz
(74) *Attorney, Agent, or Firm* — Loza & Loza, LLP

(57) ABSTRACT

Systems and methods for facilitating authentication for payment transactions using pattern-based time bound passwords. More specifically, techniques disclosed herein enable authentication of payment transactions performed by a user at a merchant terminal based on a pre-registered pattern provided by the user within a pre-defined time period limit. The pre-registered pattern drawn in the pre-defined time period is registered as a password for authenticating any payment transaction performed by the user using a payment card which is associated with an account of the user in an issuing bank. If the user provides the pre-registered pattern within the pre-defined time period limit, the payment transaction is authenticated. In another embodiment, such pattern-based time bound password is used as a second level authentication in which first level authentication is performed by a personal identification number.

20 Claims, 14 Drawing Sheets

METHODS AND SYSTEMS FOR PATTERN-BASED AUTHENTICATION FOR PAYMENT TRANSACTIONS

CLAIM OF FOREIGN PRIORITY

The present application for Patents claims priority to Singapore Patent Application number SG 10201908143R, filed Sep. 4, 2019, and which is incorporated by reference hereto, and which also assigned to assignee hereof.

TECHNICAL FIELD

The present disclosure relates to financial transactions and, more particularly to, methods and systems facilitating secure payment transactions using pattern-based authentication.

BACKGROUND

Digital payment technology has emerged as a revolutionizing change in the process of purchase and payment and has expanded the business range of merchants globally. Customers are enjoying the facility of availing everything at the doorstep with a click on an application on their device. The card-based payment methods have also made the payment process convenient and quick for everybody. However, this proliferation of digital payment at the user device and card-based payments at point of sale (POS) terminals, where transactions are often conducted remotely or between consumers and merchants who have little or no prior relationship, has led to security challenges faced by consumers, merchants, and financial institutions. This exposes the consumer to identity theft, theft of payment details and payment fraud.

Further, there is a risk of shoulder surfing or online frauds for theft of a personal identification number (PIN) at POS terminal or theft of PIN while a user performing an online transaction at a public place. The PIN is very confidential information because it is used for authenticating transactions made by the user. Thus, the consumers are now open to a greater risk of theft of PIN which may lead to heavy monetary losses to customers. This may further lead to the disinterest of the customer in using the online payment or card-based payment which effects the merchants and financial institutions. To meet these challenges, credit card companies and financial institutions are putting security measures into place. However, the currently available measures use a PIN which is generally 4-6 digits long and shown as "*" on the screen of the user device. However, a fraud, who is shoulder surfing, may get to know 2 or 3 digits and he can crack the rest of the digits as well. Therefore, there still remains a need for more secure and convenient ways for online or card-based payments which are not prone to the risk of shoulder surfing or theft of PIN. Therefore, there is a need to develop a process or system to overcome above-stated problem.

SUMMARY

Various embodiments of the present disclosure provide systems, and methods, for secure payment transactions at merchant terminals based on pattern-based authentication.

In an embodiment, a method is disclosed for secure payment transaction using pattern-based authentication. The method includes receiving, by a server system, a payment transaction request from a merchant terminal. The payment transaction request associated with an item purchased by the user at the merchant terminal. The method further includes receiving, by the server system, a password from the user via a user interface associated with the merchant terminal. The method further includes performing, by the server system, matching of the received password with a pre-registered password. The pre-registered password is registered by the user for authentication of payment transactions performed by the user, and the pre-registered password comprises a sequence of pre-defined pattern generated in a pre-defined time period. The method further includes authenticating, by the server system, the payment transaction based on successful matching of the received password from the user with the pre-registered password In another embodiment, a server system associated with a payment network is disclosed. The server system includes a memory comprising stored instructions and at least one processor configured to execute the stored instructions to cause the server system to perform a method. The method includes receiving, by the server system, a payment transaction request from a merchant terminal, payment transaction request associated to an item purchased by the user at the merchant terminal. The method further includes receiving, by the server system, a password from the user via a user interface associated with the merchant terminal. The method further includes performing, by the server system, matching of the received password with a pre-registered password. The pre-registered password is registered by the user for authentication of payment transactions performed by the user, and the pre-registered password comprises a sequence of pre-defined pattern generated in a pre-defined time period. The method further includes authenticating, by the server system, the payment transaction based on successful matching of the received password from the user with the pre-registered password.

In yet another embodiment, another method is disclosed for secure payment transaction using pattern-based authentication. The method includes receiving, by a server system, a payment transaction request from a merchant terminal, the payment transaction request associated to an item purchased by the user at the merchant terminal. The method further includes receiving, by the server system, a personal identification number (PIN) from the user via a user interface associated with the merchant terminal. The method further includes sending, by the server system, the received PIN to an issuing server for verification. The issuing server is associated with an issuing bank in which the user has a payment account, and the PIN is associated with a payment card which is used by the user for performing the payment transaction. Upon receiving a successful verification from the issuing server, the method further includes rendering, by the server system, a user interface on a display screen of a user device associated with the user. The method further includes receiving, by the server system, a password from the user via the user interface. The method further includes performing, by the server system, matching of the received password with a pre-registered password. The pre-registered password is registered by the user for a second-level authentication of payment transactions performed by the user, and the pre-registered password comprises a sequence of pre-defined pattern generated in a pre-defined time period. The method further includes authenticating, by the server system, the payment transaction based on successful matching of the received password from the user with the pre-registered password.

Other aspects and example embodiments are provided in the drawings and the detailed description that follows.

BRIEF DESCRIPTION OF THE FIGURES

For a more complete understanding of example embodiments of the present technology, reference is now made to the following descriptions taken in connection with the accompanying drawings in which.

Figure 1:
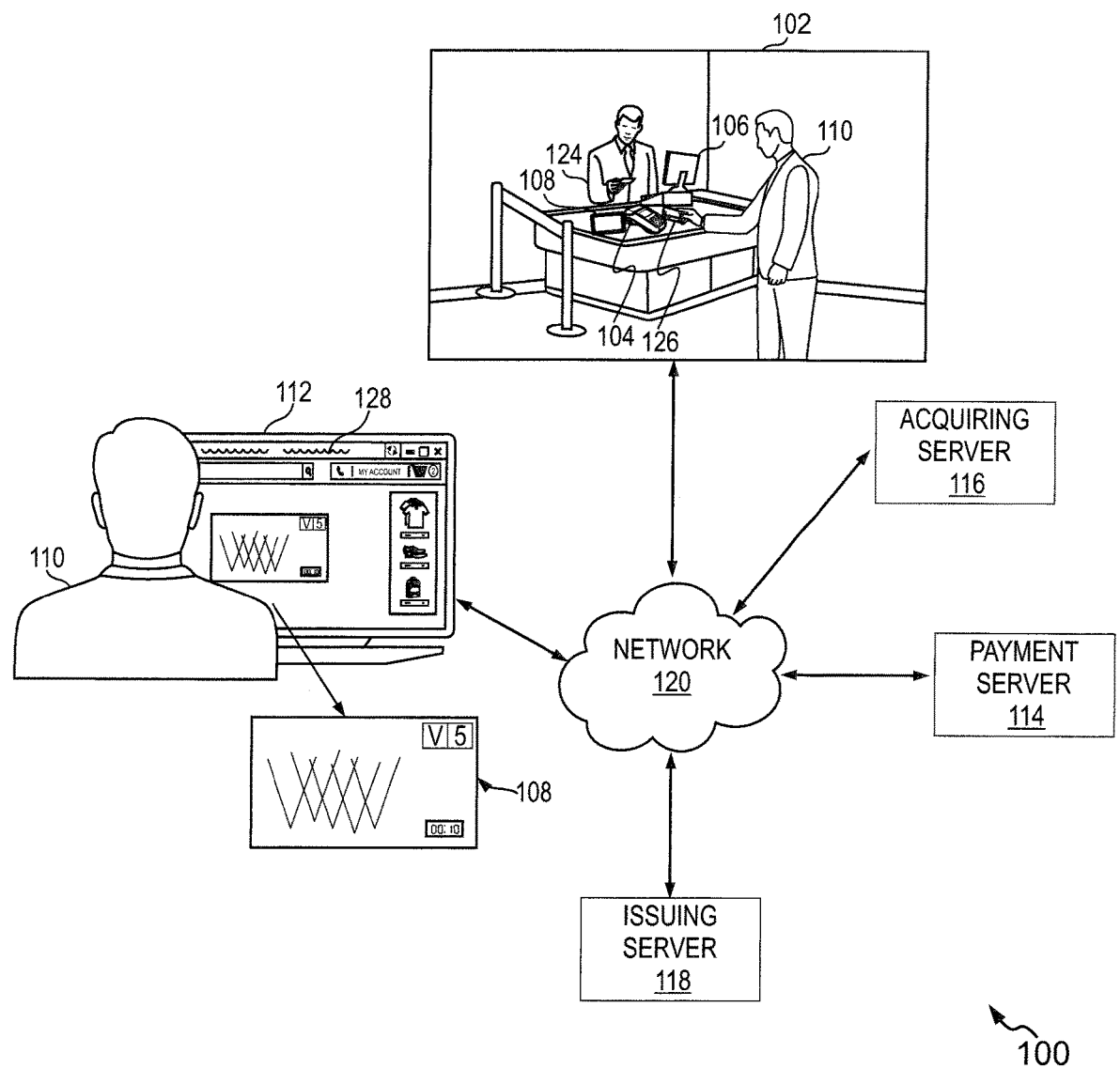
FIG. 1 illustrates an example representation of an environment related to at least some example embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The term "issuing server" used throughout the description refers to a server that holds a financial account that is used to fund the financial transaction (interchangeably referred to as "card payment transaction") of a cardholder. Further, the term "acquiring server" used throughout the description refers to a server that holds a financial account of a merchant or any entity which receives the fund from the issuing server. Examples of the issuing server and the acquiring server include, but are not limited to a bank, electronic payment portal such as PayPal®, and a virtual money payment portal. The financial accounts in each of the issuing server and the acquiring server may be associated with an entity such as an individual person, a family, a commercial entity, a company, a corporation, a governmental entity, a non-profit organization and the like. In some scenarios, the financial account may be a virtual or temporary payment account that can be mapped or linked to a primary payment account, such as those accounts managed by PayPal®, and the like.

The term "payment card", used throughout the description, refers to a physical or virtual card linked with a financial or payment account that may be presented to a merchant or any such facility in order to fund a financial transaction via the associated payment account. Examples of the payment card includes, but are not limited to, debit cards, credit cards, prepaid cards, digital wallet, virtual payment numbers, virtual card numbers, forex card, charge cards and stored-value cards. A payment card may be a physical card that may be presented to the merchant for funding the payment. Alternatively or additionally, the payment card may be embodied in form of data stored in a user device, where the data is associated with payment account such that the data can be used to process the financial transaction between the payment account and a merchant's financial account.

The term "payment server", used throughout the description, refers to a network or collection of systems used for transfer of funds through use of cash-substitutes. Payment servers may use a variety of different protocols and procedures in order to process the transfer of money for various types of transactions. Transactions that may be performed via a payment server may include product or service purchases, credit purchases, debit transactions, fund transfers, account withdrawals, etc. Payment servers may be configured to perform transactions via cash-substitutes, which may include payment cards, letters of credit, checks, financial accounts, etc. Examples of networks or systems configured to perform as payment servers include those operated by Mastercard®, VISA®, Discover®, American Express®, etc.

The term "personal identification number" used throughout the description, refers to a numerical code used in many electronic financial transactions. Personal identification numbers are usually issued in association with payment cards and may be required to complete a transaction. Personal identification numbers provide additional security on an account. They are most commonly used with debit cards or credit cards linked to a customer's bank account. Personal identification numbers (hereinafter, "PIN") usually range from four to six digits and are generated by the issuing bank through a coding system which makes each PIN unique. Typically a PIN is issued to a cardholder by mail separately from the associated card. Account holders must also ensure that they maintain their username and password which provide online access to account information. PINs are regularly required when making an electronic transaction with a merchant or when using an ATM.

The term "scratch pad" used herein represents a soft touchpad displayed in a user interface on a device, on which user can draw a pattern, and the pattern can be accepted by a processing system associated with the device. Further, the term "scratch" herein means drawing a pattern on the soft touchpad.

Overview

Various example embodiments of the present disclosure provide methods and systems for secure payment transactions using pattern-based authentication. More specifically, techniques disclosed herein enable authentication of payment transactions performed by a user at a merchant terminal based on a pre-registered pattern provided by the user within a pre-defined time period limit. The pre-registered pattern provided in the pre-defined time period is registered as a password for authenticating any payment transaction performed by the user using a payment card which is associated with an account of the user in an issuing bank.

In an example embodiment, a user gets registered with a server system for availing pattern-based authentication service for the payment transactions performed by the user. The registration for availing pattern-based authentication service is done in two step process. The first step includes registering the user by receiving details such as username, card number, a card verification value (CVV) number and PIN associated with the payment card issued by the issuing bank. The second step includes registration of the pattern in which the user generates a sequence of pattern provided within a time period to make it as a password for authentication of the payment transactions performed by the user. Hence, when the user performs any payment transaction in the future, he/she needs to provide the sequence of pattern within the time period in order to successfully authenticate the payment transaction. The generated password is stored in a server system which is providing the service of pattern-based authentication for payment transactions. For example, in a non-limiting manner, the user registered a password which includes drawing alphabet "P" four times followed by drawing alphabet "S" five times within a time period of 10 seconds. Then for authentication of any payment transaction which will be performed by the user using the payment card in future, the user needs to draw the alphabet "P" four times followed by drawings the alphabet "S" five times within 10 seconds in order to authenticate the payment transaction.

In another example embodiment, the user purchased an item at the merchant terminal. The merchant terminal can be a POS terminal or an e-commerce website hosted by the merchant. The merchant terminal provides a user interface with a prompt for entering the password for authentication. The user enters the password which is the pre-registered sequence of pattern provided within the pre-defined time period (also referred to as "pre-set time period"). Upon receiving the password, the payment transaction is sent from the merchant terminal to the server system (payment server) for authentication.

Upon receiving the payment transaction from the merchant terminal, the server system authenticates the payment transaction by matching the password entered by the user with the pre-registered password. The process of matching includes matching whether the sequence of pattern entered by the user is same as the sequence of pattern present in the pre-registered password by the user and whether the sequence of pattern is entered in the pre-set time period limit or not. For example, the user pre-registered the password which includes drawing alphabet "P" four times followed by drawing alphabet "S" five times within 10 seconds. Then the payment transaction performed by the user is successfully authenticated when the user draws the pre-registered password i.e. the sequence of drawing the alphabet "P" for four times followed by drawing the alphabet "S" five times within 10 seconds. It shall be noted that the pattern drawn by the user on the user interface is not visible on a display screen of the user device or merchant device associated with the merchant terminal.

When the entered password from the user and the pre-registered password match with each other, then the server system sends the payment transactions to the issuing server for approving the payment transaction. Before sending the transaction to the issuing server, the server system extracts the password which is registered with the issuing server for authentication of the user. This registered password includes a sequence of alpha-numeric characters. The issuing server receives the payment transaction along with the registered password. The issuing server authenticates and approves the payment transaction based on the password and the account balance of the user.

In another example embodiment, there are a plurality of options provided to the user by the server system for generating the password which includes the sequence of patterns provided in the pre-defined time period. In one of the options, user scratches a touchpad rendered on the user interface (like a mouse pad in laptop or notebook devices) to draw a sequence of alphabets or random pattern within a specific time duration. In one option, the user may be provided with multiple attempts to set the password. For instance, in an example, the user has selected a time duration of 5 seconds (secs), and the user draws a "V" 10 times in 5 seconds in the first attempt. Further, in the second attempt, the user draws the same pattern 9 times. So, based on both the attempts, the password set by the user can be considered as drawing "V" 9-10 times in 5 secs. So, when the user gets this window during the actual payment transaction, the user needs to draw "V" 9 or 10 times within 5 secs time duration for the authentication of the payment transaction.

Another option includes the user to enter a pattern related to a word which the user wants to use as a password. Suppose the user would like a pattern for "HELLO". The user needs to swipe the word "HELLO" on a touch keypad (also referred to as "scratch pad") which is rendered on the user interface by the server system. In the next step, the server system renders the scratch pad on the user interface and the user needs to draw, on the scratch pad, a pattern corresponding to design/gesture created by tracing the hand movement of the user (e.g., traces of finger or stylus on touch pad) while swiping the word "HELLO" on the touchpad. The server system also takes into consideration the time period limit in which the user has drawn the pattern. For example, in a non-limiting manner, the user draws the pattern for word "HELLO" in 2 seconds then the password will be drawing of pattern for word "HELLO" within 2 seconds. Once the user draws the pattern and confirms the pattern, then this will be set as the password for authentication of the payment transactions performed by the user. At the backend during payment transaction when the user enters this pattern, then the server system performs the authentication based on pattern matching.

In yet another option of generating the password, the server system will render a microphone on the user interface and the user will need to say the word that user wants to use it as a password. For example, if the user utters "Hello" 5 times in 5 seconds then the password will be uttering "Hello" for 5 times within 5 seconds. At the backend during the actual payment transaction, when the user utters the word "Hello" 5 times within 5 seconds the server system will authenticate the payment transaction. Further, the server system may also create a corresponding pattern for the word "hello" based on automatically interpreting the design/gesture traced by the hand movement required to type hello using touch keypad.

In an alternate or additional embodiment, the pattern-based authentication can be used as a second level authentication. In this case, the payment transaction is first verified based on the PIN associated with the payment card of the user issued by the issuing bank. Post verification from the issuing bank, the server system renders the user interface to receive the pre-registered pattern in the pre-set time period from the user for the second level authentication. Upon successful authentication, the server system approves the payment transaction.

The above-explained process of using patterns provided in pre-defined time period as a password for authentication of payment transactions provides more security as it is very difficult for anyone who is shoulder surfing to know the password of the user.

FIG. 1 illustrates an exemplary representation of an environment 100, in which at least some example embodiments of the present disclosure can be implemented. The environment 100 is exemplarily shown including a merchant facility 102 equipped with a POS terminal 104, and a merchant interface device 106 and a scratch pad 108 communicatively coupled with the POS terminal 104. The environment 100 also depicts a user device 112 associated with a cardholder 110 ((also referred to herein as 'a user 110'), a payment server 114, an issuing server 118, and an acquiring server 116. Examples of the merchant 102 may include any retail establishments such as, restaurant, supermarket or business establishments such as, government and/or private agencies, toll gates, parking lot or any such place equipped with POS terminals, such as the POS terminal 104 or commercial website establishments such as, restaurant, supermarket or business establishments such as, government and/or private agencies, toll gates, parking lot or any such place where customers visit for performing financial transaction in exchange for any goods and/or services or any transaction that requires financial transaction between customers and a merchant. In various embodiments, the merchant interface device 106 can be a telephone or a computer system operated by an agent 124 for performing payment transactions on behalf of a customer, for example, a cardholder 110 using a payment card 126.

In an example embodiment, the scratch pad 108 is a user interface device enabled to receive user input for authentication. The scratch pad 108 may be a graphic tablet capable of receiving hand drawn patterns or pattern drawn using a stylus. The scratch pad 108 is also configured such that it does not display what is being drawn on the scratch pad 108. In a non-limiting manner, the drawn pattern is read through the scratch pad 108 by measuring the pressure received by the horizontally and vertically placed sensors in the scratch pad 108. In various embodiments the scratch pad 108 communicates either directly with the payment server 114 or indirectly communicates with the payment server 114 via the POS terminal 104 and the acquiring server 116. In an alternate embodiment, the scratch pad 108 may also correspond to a virtual touch keypad or a digital microphone. Examples of the scratch pad 108 include, but are not limited to, customized user interface devices, capacitive tablets, touch keypads, or microphones.

The user device 112 may be a portable user device. Examples of the portable user device 112 include, but are not limited to, a smart phone, a personal digital assistant (PDA), and a laptop, among others. In some embodiments, the user device 112 may be a non-portable user device. Examples of the non-portable user device 112 include a personal computer (PC) and a kiosk, among others. The user device 112 may be a device that the user (e.g., the cardholder 110) operates to browse a website 128 and to perform a transaction. The cardholder 110 may browse a website (e.g. the website 128) over the internet and may perform a transaction to buy a product or a service.

The payment server 114 is a part of payment interchange network, and the payment server 114 is configured to facilitate payment transactions by the transfer of information between the acquiring server 116 and the issuing server 118. The issuing server 118 is associated with a financial institution normally called as an "issuer bank" or "issuing bank" or simply "issuer" or simply "bank", in which the cardholder 110 may have an issuer account, which issues one or more payment cards, such as a credit card or a debit card. The payment cards are linked to an issuer account associated with a unique payment account number of the cardholder 110. The cardholder 110 can use any of the payment cards to tender payment for the purchase. The issuer bank is responsible for determining whether a customer's issuer account is in good standing and whether the purchase is covered by the customer's available credit line or account balance. Based on these determinations, the payment transaction associated with the payment transaction request is approved or declined. The payment server 114 further facilitates authentication of payment transaction in a secure manner using time-bound patterns as passwords, specifically for the cardholders who have registered for Pattern-Authentication service (hereinafter, "Pattern-Auth service").

The acquiring server 116 is associated with a financial institution normally called as a "merchant bank" or the "acquiring bank" or "acquirer bank" or simply "acquirer", in which the merchant 102 may have a merchant account. Using the network 120, the acquiring server 116 will communicate with the issuing server 118 to determine whether the cardholder's account is in good standing and whether the transaction amount of the purchase is covered by the cardholder's available account balance. Based on these determinations, authorization of the transaction is declined or accepted. When the authorization is accepted, the available balance of cardholder's account is decreased.

The payment card 126 is issued by the issuing server 118 in association with the payment server 114. The merchant 102, the user device 112, the payment server 114, the issuing server 118, and the acquiring server 116 are communicatively coupled with each other via the network 120.

In an example application scenario, the cardholder 110 is interested in availing the Pattern-Auth service for secure card-based payment transactions which can be performed at the merchant 102 or at the website 128 hosted by the merchant 102 via the user device 112 for purchasing a product or a service. The Pattern-Auth service can be provided by a server system (for example, but not limiting to, the payment server 114 or the issuing server 118). In order to avail the Pattern-Auth service, the cardholder 110 will register on a service portal 130 (shown in FIG. 5) managed by the payment server 114. The cardholder 110 can register on the service portal 130 by accessing a website hosted by the payment server 114. During the registration process, the cardholder 110 provides details such as name of the cardholder, permanent address, email-id, identity proof details, card number of the payment card 126, PIN of the payment card 126 etc., on the service portal 130. The payment server 114 sends the shared details of the cardholder to the issuing server 118 for verification. The issuing server 118 validates the details shared by the cardholder 110 based on registered information of the cardholder 110 at the issuing server 118. The issuing server 118 sends notification stating successful validation of the details shared by the cardholder 110. Upon receiving the notification from the issuing server 118, the payment server 114 renders a user interface on the user device 112 for creation of login credentials including UserID and password for future access at the service portal 130 by the cardholder 110.

Once the cardholder 110 is successfully registered and logged in into the service portal 130, the next step includes registration of the pattern which includes generation of a sequence of pattern drawn within a time period limit by the user in order to set it as a password for authentication of the payment transactions performed by the user in future. The sequence of pattern generated along with the time period limit (hereinafter referred as "pre-set time period") is stored in the server system as the password (hereinafter referred as "pre-registered password") for authentication. Hence, when the cardholder 110 will perform any payment transaction in future, the cardholder 110 needs to provide the sequence of pattern within the pre-set time period in order to successfully authenticate the payment transaction. The generated password is stored in a server system which is providing the service of pattern-based authentication for payment transactions. For example, in a non-limiting manner, the cardholder 110 registers a password which includes drawing alphabet "V" eight times within the pre-set time period ranging from 10 to 12 seconds. Then, for authentication of any payment transaction which will be performed by the user using the payment card 126 in future, the user needs to draw the alphabet "V" eight times within 10 to 12 seconds in order to authenticate the payment transaction.

In another example embodiment, the cardholder 110 purchased an item at the merchant 102. The merchant 102 may have the POS terminal 104 or an e-commerce website 128 hosted by the merchant 102. The merchant 102 provides a user interface (for example, but not limited to, the scratch pad 108) with a prompt for entering the password for authentication. The user enters the password which is the pre-registered sequence of pattern provided within the pre-set time period. Upon receiving the password, the payment transaction is sent from the merchant terminal 102, via the acquiring server 116, to the payment server 114 for authentication.

Upon receiving the payment transaction from the merchant terminal 102, the payment server 114 authenticates the payment transaction by matching the password entered by the cardholder 110 with the pre-registered password. The process of matching includes matching whether the sequence of pattern entered by the user is same as the sequence of pattern present in the pre-registered password by the user and whether the sequence of pattern is entered in the pre-set time period limit or not. For example, in a non-limiting example, the cardholder 110 has already pre-registered the password including drawing alphabet "P" four times followed by drawing alphabet "S" five times within 10 seconds. Then, the payment transaction performed by the user is successfully authenticated when the cardholder 110 draws the pre-registered password i.e. the sequence of drawing the alphabet "P" for four times followed by drawings the alphabet "S" five times within 10 seconds. It shall be noted the pattern drawn by the user on the user interface is not visible on a display screen of the user device 112 or merchant interface device 106 associated with the merchant terminal 102.

The scratch pad 108 is composed of a distributed passive array of capacitors (i.e. an array where no active elements such as transistors are involved) whose capacitance varies according to the pressure exerted over a touch screen of the scratch pad 108. The payment server 114 collects and computes the subsequent capacitance variations. Each capacitor has been made with the coupling capacitance between two conductive strips separated by an elastic and dielectric material. The sensing array results from the crossing of these conductive threads patterned in rows and columns of a matrix. When the dielectric layer between a given row and column of electrodes is squeezed, as pressure is exerted over the corresponding area on the display screen, the coupling capacitance between the two is increased. By scanning each column and row, the image of the pressure field can be obtained. The obtained images are stored in the payment server 114 as the password for authentication. The payment server 114 also monitors the time taken by the cardholder 110 in creating the sequence of pattern and it is stored along with the obtained image In an alternate embodiment, the scratch pad 108 is composed of a distributed array of pixels whose value varies according to the pressure exerted over a touch screen of the scratch pad 108. The payment server 114 collects and computes the subsequent variations in pixel value and generates a matrix of each pixel value. Therefore each sequence of pattern generated by the cardholder 110 is converted into an encoded pixel matrix by the payment server 114. The payment server 114 also monitors the time taken by the cardholder 110 in creating the sequence of pattern and it is stored along with the matrix of the pixel values.

In another example embodiment, during authentication of payment transaction performed by the cardholder 110, the payment sever 114 matches the password entered by the cardholder 110 for the in-process payment transaction with the pre-registered password. In a non-limiting example, the payment server 114 converts the received password into a matrix of pixel values based on sensing the hand movement (e.g., by recognizing traces of finger or stylus on touch pad) of the cardholder 110 on the scratch pad 108. The payment server 114 matches the pixel values in the matrix generated for the received password from the cardholder 110 with the pixel values in the matrix of the pre-registered password. Further the payment server 114 also records the time taken by the cardholder 110 while entering the pattern, and the payment server 114 further matches the recorded time taken with the pre-set time period limit. If the pixels values of both matrices are matched with each other and the recorded time taken matched with the pre-set time period limit, then the password received from the cardholder 110 is determined to be successfully matched with the pre-registered password.

When the entered password by the cardholder 110 and the pre-registered password are matched with each other, then the payment server 114 sends the payment transactions to the issuing server 118 for approving the payment transaction. Before sending the transaction to the issuing server 118, the payment server 114 extracts the PIN which is registered with the issuing server 118 for authentication of the user 110. This registered PIN includes a sequence of alpha-numeric characters. The issuing server 118 receives the payment transaction along with the registered PIN. The issuing server 118 authenticates and approves the payment transaction based on the PIN and the account balance of the user 110.

In another example embodiment, there are a plurality of options provided to the cardholder 110 by the payment server 114 during registration of the password which includes the sequence of patterns drawn in the pre-defined time period. In one of the options, the cardholder 110 scratches a touchpad rendered on the user interface to draw a sequence of alphabets or random pattern for a specific time duration. Another option includes the cardholder 110 to enter a pattern related to a word which the cardholder 110 wants to use as a password. Suppose the cardholder 110 would like a pattern for "HELLO". The cardholder 110 needs to swipe the word "HELLO" on a touch keypad which is rendered on the user interface by the payment server 114. In the next step, the payment server 114 renders the scratch pad 108 on the user interface and the user needs to draw, on the scratch pad 108, a pattern corresponding to design/gesture created by tracing the hand movement of the user while swiping the word "HELLO" on the scratch pad 108. The payment server 114 also takes into consideration the time period limit in which the cardholder 110 has drawn the pattern. For example, if the cardholder 110 draws the pattern for word "HELLO" in 10 seconds then the password will be drawing of pattern for word "HELLO" within 10 seconds. Once the cardholder 110 draws the pattern and confirms the pattern, then this will be set as the password for authentication of the payment transactions performed by the cardholder 110. At the backend during payment transaction, when cardholder 110 enters this pattern then the payment server 114 will do the authentication based on pattern matching as explained in above description.

In yet another option of generating the password, the payment server 114 will render a microphone on the user interface and the cardholder 110 will need to say the word that cardholder 110 wants to use as a password. Suppose the cardholder 110 uttered "Hello" 5 times in 5 seconds, then the password will be uttering "Hello" for 5 times within 5 seconds. At the backend during payment transaction, when the cardholder 110 utters the word "Hello" 5 times within 5 seconds, the payment server 114 will authenticate the payment transaction. Further, the payment server 114 may also create a corresponding pattern for the word "hello" based on interpreting a design/gesture created by tracing the hand movement required to type hello using a touch keypad.

In an alternate or additional embodiment, the pattern-based authentication can be used as a second level authentication. In this case, the payment transaction is first verified by the issuing server 118 based on the PIN associated with the payment card 126 of the cardholder 110 issued by the issuing bank. Post verification from the issuing bank, the payment server 114 renders the user interface to receive the pre-registered pattern in the pre-set time period limit from the cardholder 110 for second level authentication. Upon successful authentication the server system approves the payment transaction.

Figure 2:
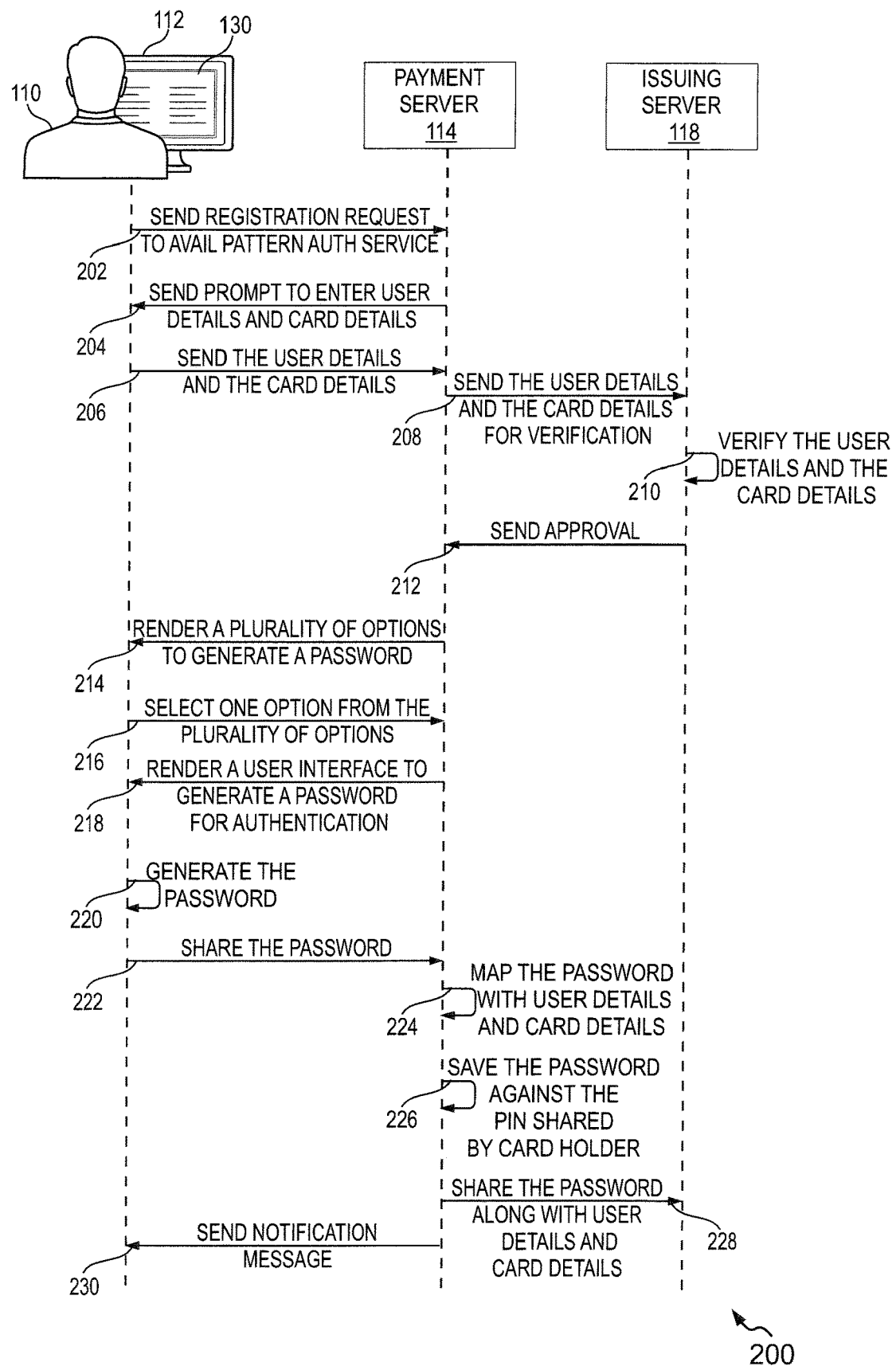
FIG. 2 illustrates a sequence flow diagram representing a method of registration for a Pattern-Auth service at the service portal and generation of a pattern based time bound password for authentication of payment transactions, in accordance with an embodiment of the present disclosure.

FIG. 2 illustrates a sequence flow diagram representing a method 200 of registration for a Pattern-Auth service at the service portal 130 and generation of a pattern based time bound password for authentication of payment transactions performed by the cardholder 110, in accordance with an example embodiment.

At 202, the cardholder 110 sends a registration request to the payment server 114 via the service portal 130 to opt for the Pattern-Auth service after completing the login procedure at the service portal 130. The service portal 130 acts as a gateway and redirects the registration request to the payment server 114.

At 204, Upon receiving the registration request from the cardholder 110 via the service portal 130, the payment server 114 sends a prompt to the user device 112 for entering details of the cardholder 110 and the payment card 126, for example, but not limited to, a credit card or a debit card. The cardholder 110 opts for the Pattern-Auth service for the payment transaction performed by the cardholder 110 using the payment card 126. However, the cardholder 110 can also register for multiple payment cards also.

At 206, the cardholder 110 provides user details and card details such as name of the cardholder 110, a personal identification (ID) of the cardholder 110, a card number of the payment card 126, name on the payment card 126, expiry date of the payment card 126, CVV number printed on the payment card 126, and PIN issued by the issuing bank for authentication of the payment card 126. The cardholder 110 can raise the registration request via a website (for example, the website 128) hosted by the payment server 114 to access the service portal 130. Alternatively, the cardholder 110 can raise the registration request by calling to a customer care number associated with the payment server 114.

At 208, upon receiving the user details and the card details from the cardholder 110, the payment server 114 forwards the details to the issuing server 118 for verification. At 210, the issuing server 118 verifies the user details and the card details based on checking its database having all the information registered for each user. At 212, upon successful verification of the user details and the card details, the issuing server 118 sends an approval to the payment server 114.

At 214, upon receiving the approval from the issuing server 118, the payment server 114 renders a plurality of options on the user device 112 for generating a password for authentication. The password corresponds to a sequence of patterns drawn within a pre-set time period limit.

At 216, the cardholder 110 selects one option from the plurality of the options for registering a sequence of patterns within the pre-set time period limit as the password for authentication.

Figure 6:
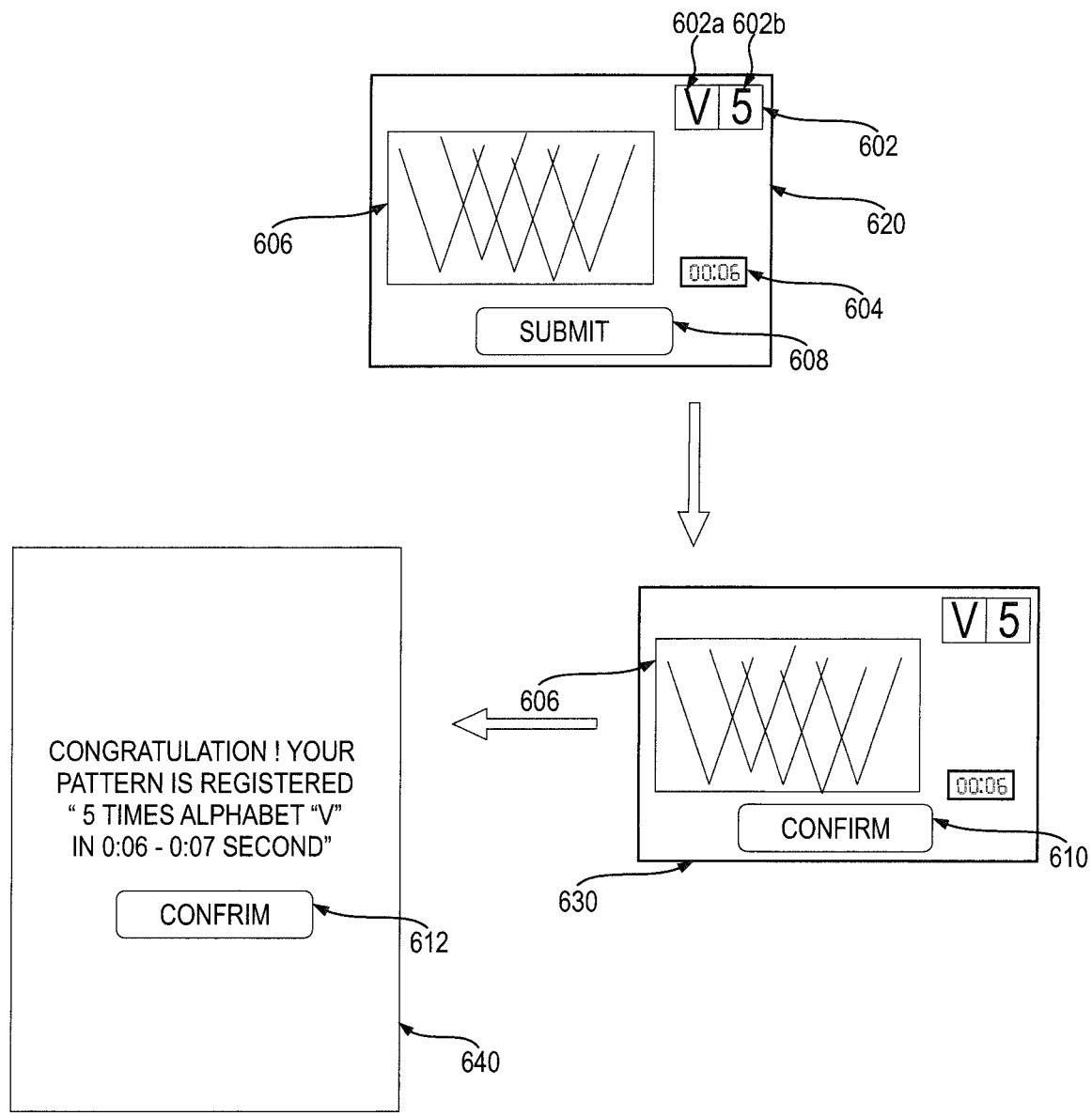
FIGS. 6-8 collectively illustrate example representation of a plurality of UIs for generation of password based on plurality of options provided according to Pattern-Auth service at a service portal, in accordance with an embodiment of the present disclosure.
Figure 7:
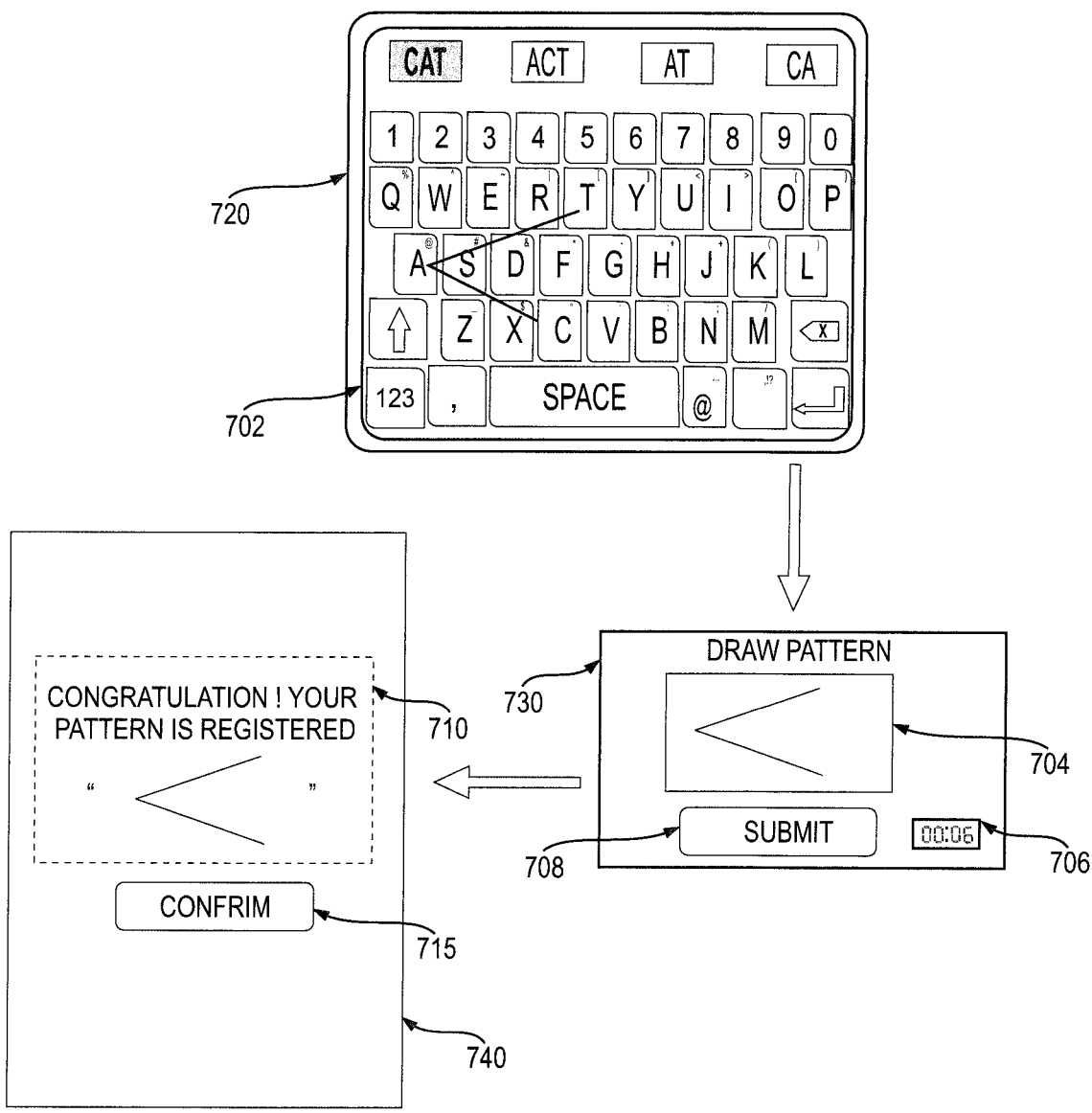
Figure 8:
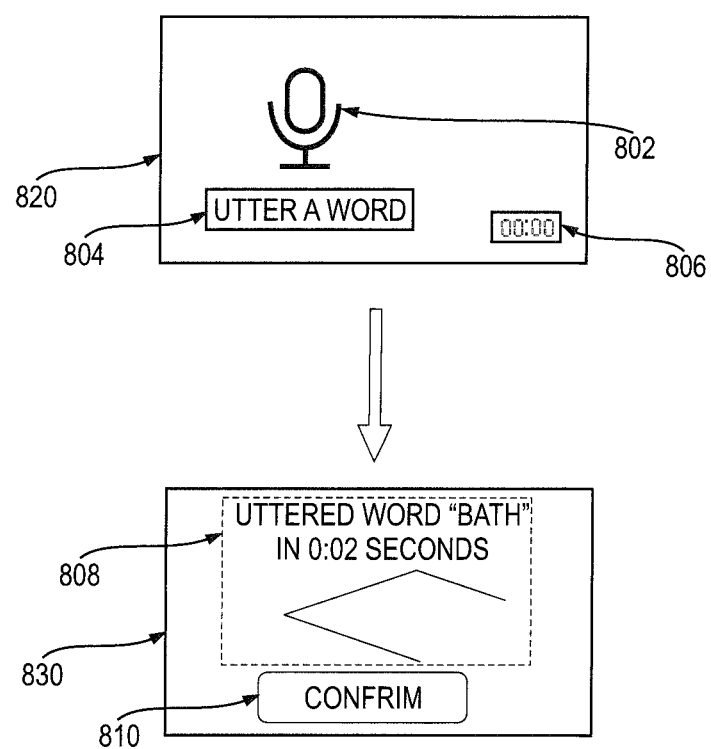

At 218, upon receiving the selection of one option from the plurality of options, the payment server 114 renders a user interface on the user device 112 for generation of the pattern based on the type of the option selected by the cardholder 110. For example, if the option selected indicates generating the password by drawing a sequence of alphabets (as shown in FIG. 6) within a pre-set time period limit, then the user interface will include a scratch pad (for example, the scratch pad 108 shown in FIG. 1) along with a timer clock. If the option selected indicates generating the password by creating a pattern which corresponds to a swiping trajectory of a word (as shown in FIG. 7) then the user interface will include a touch keypad with swiping feature enabled and the timer clock. Further, if the option selected indicates generating the password by uttering a word (as shown in FIG. 8) then the user interface will include a microphone along with a timer clock.

At 220, the cardholder 110 generates the password in accordance with the selected option. The password is a sequence of alphabets or random pattern drawn within a specific time duration. At 222, the cardholder 110 sends the password to the payment server 114.

At 224, upon receiving the password, the payment server 114 maps the password with the user details and the card details. At 226, the payment server 114 saves the password against the PIN shared by the cardholder 110 in a table in a database of the payment server 114 for future reference and use. At 228, alternatively or additionally, the payment server 114 shares the password along with the user details and the card details with the issuing bank based on business policy with the issuer 118 to participate in the pattern-based authentication process. At 230, the payment server 114 sends a notification message indicating that the cardholder 110 is eligible to avail the Pattern-Auth service to the user device 112.

Figure 3:
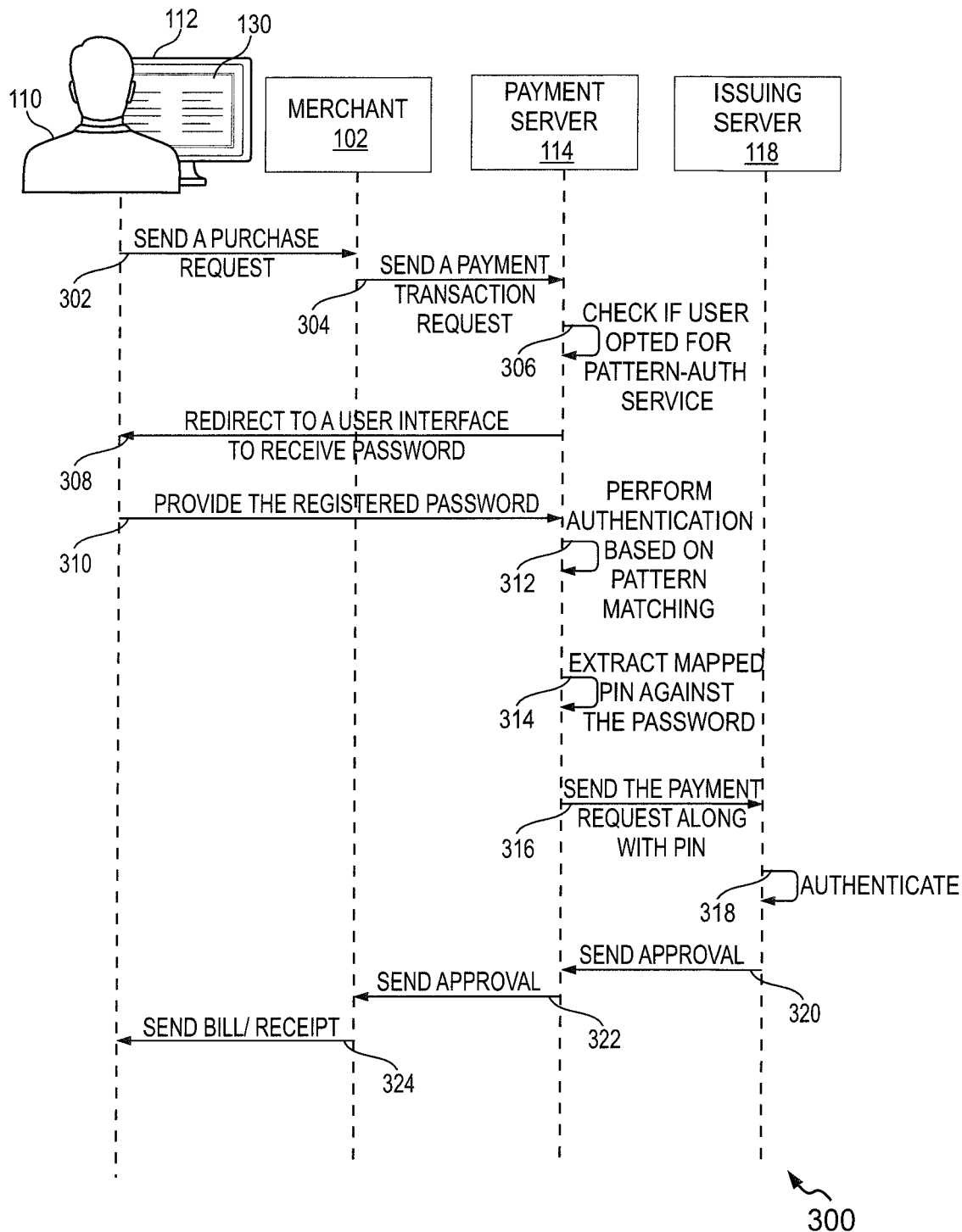
FIG. 3 illustrates a sequence flow diagram representing a method of performing a transaction using the Pattern-Auth service, in accordance with an embodiment of the present disclosure.

FIG. 3 illustrates a sequence flow diagram representing a method 300 of performing a transaction using the Pattern-Auth service in accordance with an example embodiment. At 302, the cardholder 110 sends a purchase request to purchase a product or a service at the merchant 102. The purchase request indicates buying a product or a service at the merchant 102 using any payment card (for example the payment card 126) such as debit card, credit card etc.

At 304, upon receiving the purchase request, the merchant 102 sends a payment transaction request including the details of the payment card 126 and a price of the product or the service to the payment server 114 via the acquiring server 116. The payment transaction request indicates a transaction performed by the cardholder 110 at the merchant 102 to buy the product or the service.

At 306, the payment server 114 checks whether the cardholder 110 has opted for the Pattern-Auth service against the payment card 126 used for the payment transaction. At 308, upon determining that the cardholder 110 has registered for the Pattern-Auth service, redirect the cardholder 110 to a user interface to receive the pre-registered password from the cardholder 110 for authentication of the payment transaction. It shall be noted herein that if the cardholder 110 is making the purchase online then the payment server 114 redirects the screen of the user device 112 to the user interface, and if the cardholder 110 is making the purchase at a brick and mortar shop then the POS terminal 104 at the merchant 102 is equipped with an additional user interface device (for example, but not limited to, the scratch pad 108) for receiving the password for authentication.

At 310, the cardholder 110 provides the registered pattern to the payment server 114 via the user interface. At 312, the payment server 114, upon receiving the password from the cardholder 110, performs authentication of the payment transaction based on matching the password provided by the cardholder 110 with the pre-registered password based on pattern matching and time period limit matching. A password is successfully matched when the pattern drawn by the cardholder 110 matches with the pre-registered pattern and the time taken by the cardholder 110 in drawing the pattern matches with the pre-set time period limit.

At 314, upon successfully authenticating the payment transaction based on successful matching of the password received from the cardholder 110 with the pre-registered password, the payment server 114 extracts the mapped PIN against the pre-registered pattern from the table stored in the database associated with the payment server 114.

At 316, the payment server 114 sends the payment transaction along with the extracted PIN to the issuing server 118 for authentication. At 318, the issuing server 118 authenticates the payment transaction based on the validity of the PIN and checking whether the cardholder 110 has sufficient fund in his/her account at the issuing server 118 in order to be eligible to purchase the product.

At 320, the issuing server 118 sends approval for the payment transaction to the payment server 114. At 322, the payment server 114 sends the approval to the merchant 102 via the acquiring server 116 and transfers the purchase amount of the product from the account of the cardholder 110 at the issuing bank to the account of the merchant 102 at the acquiring bank. At 324, the merchant 102 sends a bill receipt with the cardholder 110 indicating successful completion of purchase of the product or the service. The bill receipt can be at least one of a paper receipt, a message or an email.

Figure 4:
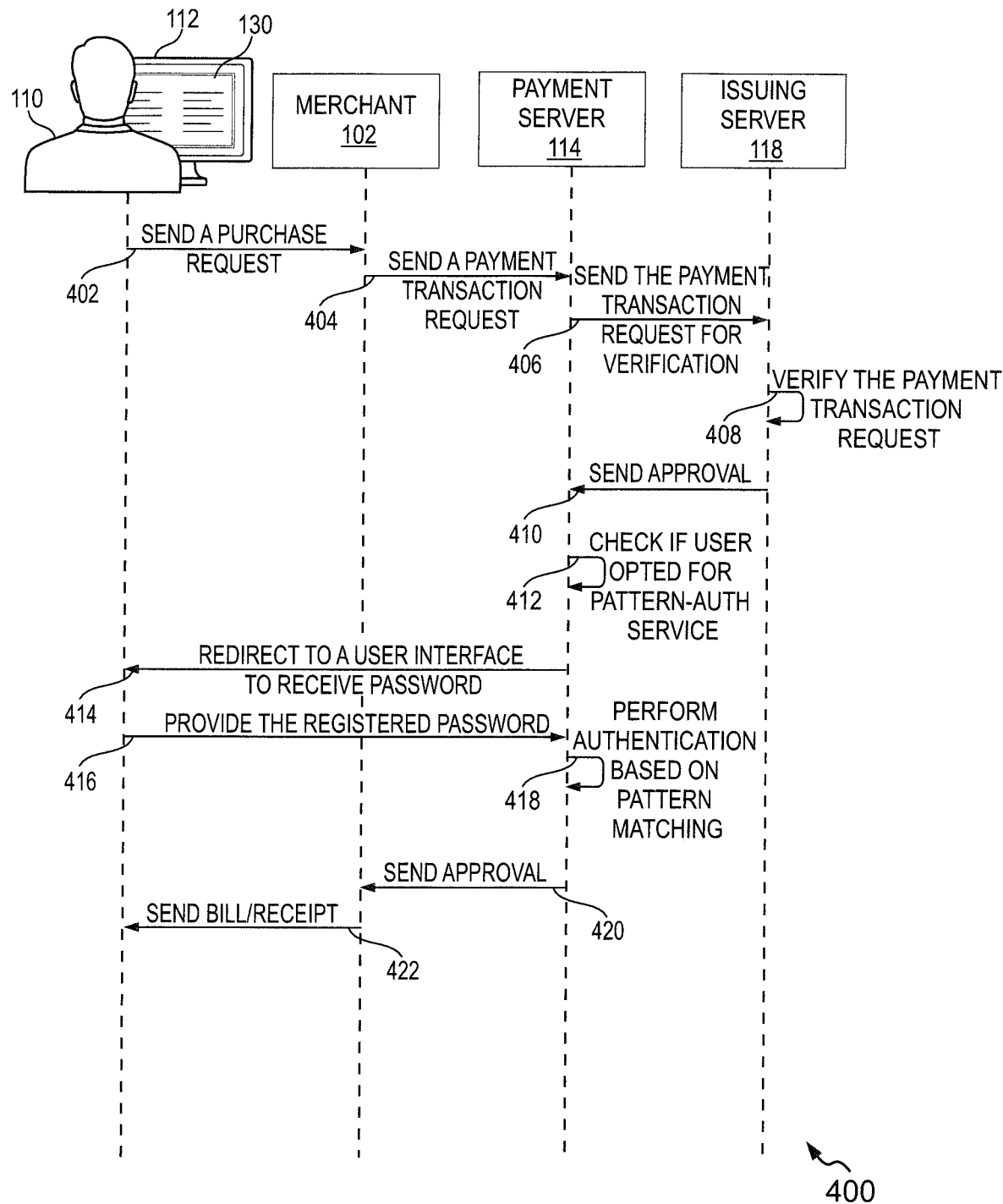
FIG. 4 illustrates a sequence flow diagram representing another method of performing a second level authentication of a payment transaction using the Pattern-Auth service, in accordance with an embodiment of the present disclosure.

FIG. 4 illustrates a sequence flow diagram representing another method 400 of performing a second level authentication of a payment transaction using the Pattern-Auth service, in accordance with an example embodiment of present disclosure.

At 402, the cardholder 110 sends a purchase request to purchase a product or a service at the merchant 102. The purchase request indicates buying a product or a service at the merchant 102 using any payment card (for example the payment card 126) such as debit card, credit card etc.

At 404, upon receiving the purchase request, the merchant 102 sends a payment transaction request including the details of the payment card 126 and a price of the product or the service to the payment server 114 via the acquiring server 116. The payment transaction request indicates a transaction performed by the cardholder 110 at the merchant 102 to buy the product or the service.

At 406, upon receiving the payment transaction request from the cardholder 110, the payment server 114 forwards the payment transaction request to the issuing server 118 for verification. The payment transaction request comprises details of the payment card 126 such as card number and the PIN issued by the issuing server 118 for verification, details of the cardholder 110 such as name of the cardholder 110, and a purchase amount.

At 408, the issuing server 118 verifies the details shared by the cardholder 110 based on checking its database having all the information registered for each customer and checking an outstanding balance of the account of the cardholder 110. At 410, upon successful verification, the issuing server 118 sends an approval to the payment server 114. This may be considered as a first level of authentication.

At 412, upon receiving approval from the issuing server 118, the payment server 114 checks whether the cardholder 110 has opted for the Pattern-Auth service against the payment card 126 used for the payment transaction. The Pattern-Auth service is used as a second-level authentication for the payment transaction wherein first level authentication being the verification performed by the issuing server 118.

At 414, upon determining that the cardholder 110 has registered for the Pattern-Auth service, the payment server 114 redirects the cardholder 110 to a user interface to receive the pre-registered password from the cardholder 110 for authentication of the payment transaction. It shall be noted herein that if the cardholder 110 is making the purchase online then the payment server 114 redirects the screen of the user device 112 to the user interface, and if the cardholder 110 is making the purchase at a brick and mortar shop then the POS terminal 104 at the merchant 102 is equipped with an additional user interface device (for example, but not limited to, the scratch pad 108) for receiving the password for authentication. At 416, the cardholder 110 provides the registered pattern to the payment server 114 via the user interface.

At 418, the payment server 114, upon receiving the password from the cardholder 110, perform authentication of the payment transaction based on matching the password provided by the cardholder 110 with the pre-registered password based on pattern matching and time period limit matching. A password is successfully matched when the pattern drawn by the cardholder 110 matches with the pre-registered pattern and the time taken by the cardholder 110 in drawing the pattern matches with the pre-set time period limit.

At 420, upon successfully authenticating the payment transaction based on successful matching of the password received from the cardholder 110 with the pre-registered password, the payment server 114 sends the approval to the merchant 102 via the acquiring server 116 and transfers the purchase amount of the product from the account of the cardholder 110 at the issuing bank to the account of the merchant 102 at the acquiring bank.

At 422, the merchant 102 sends a bill receipt with the cardholder 110 indicating successful completion of purchase of the product or the service. The bill receipt can be at least one of a paper receipt, a message or an email.

Figure 5:
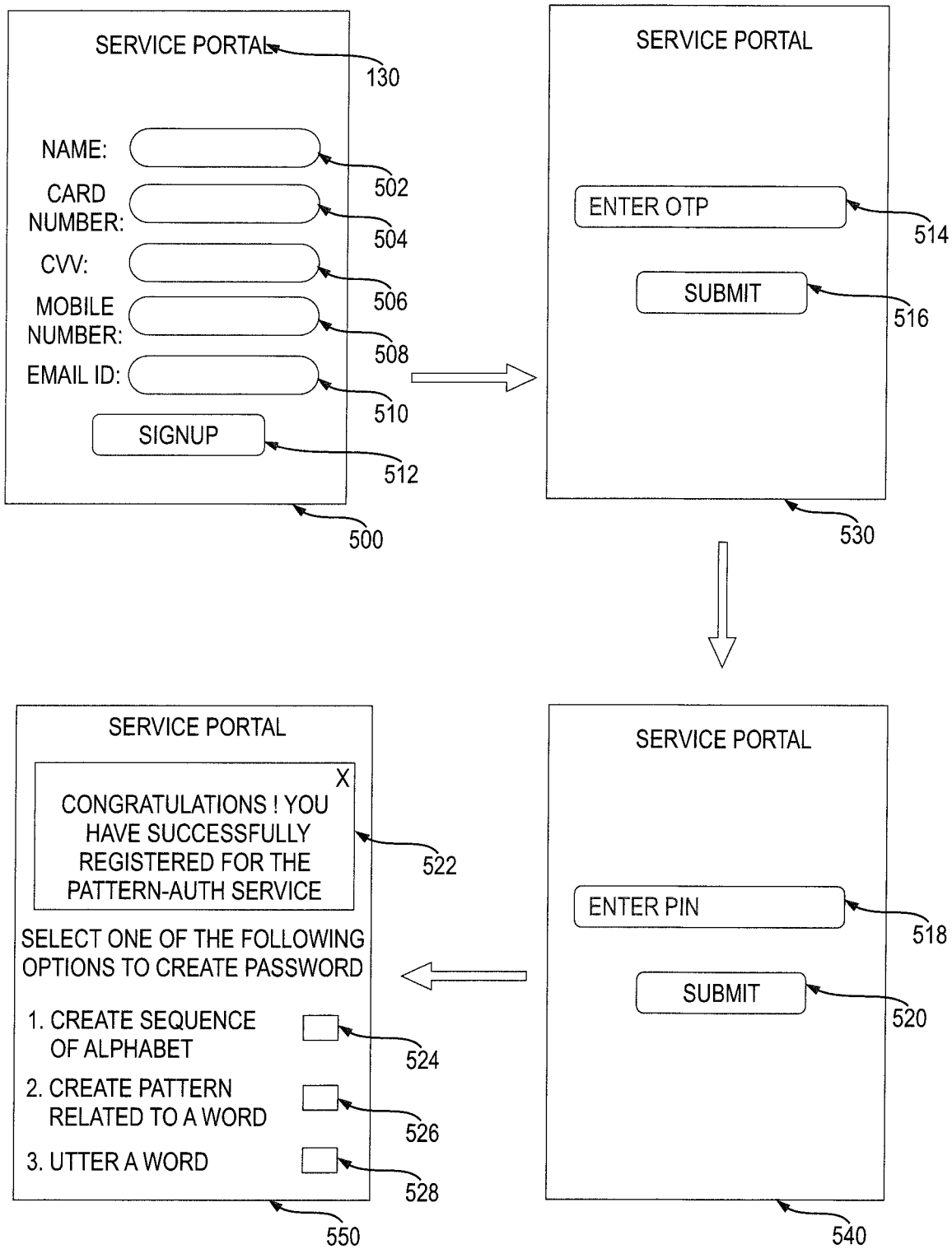
FIG. 5 illustrates example representations of a plurality of UIs displayed on a display screen of the user device for registration for the Pattern-Auth service at a service portal, in accordance with an embodiment of the present disclosure.

FIG. 5 is an example representation of a plurality of user interface (UIs) (500, 530, 540, and 550) displayed to the cardholder 110 on a display screen of the user device 112 configured to render selection inputs for registration of the cardholder 110 for the Pattern-Auth service, in accordance with an example embodiment of the present disclosure.

As shown in the UI 500, a registration page of the service portal 130 is open on the user device 112 which displays input fields (502-510) to be filled by the cardholder 110 for registering for the Pattern-Auth service. The input fields are Name 502 of the cardholder 110, card number 504 of the payment card 126, CVV number 506, mobile number 508 of the cardholder 110 and an email-id 510 of the cardholder 110. The cardholder 110 fills respective details in the input fields (502-510) and presses a click button 512 labeled as "sign-up" for processing with the registration for the Pattern-Auth service. It shall be noted, that even though the explanation considering the cardholder 110 is getting registered as a new member with the payment server 114, it is no way limiting as a person ordinary skilled in the art will understand that the cardholder 110 may be a registered member having an account at the service portal 130, and can directly login to the service portal 130 with a user-id and password.

Once the cardholder 110 clicks the sign-up button 512, the next UI 530 is rendered on the display screen of the user device 112. The UI 530 is an initial verification page including an input field 514 for one-time password (OTP) which is sent to the registered mobile number or email-id of the cardholder 110. The cardholder 110 enters the received OTP received in the input field 514 and click on the button 516 labelled as "submit" to submit the OTP for verification. Once the verification is successfully completed, the next UI 540 is rendered on the display screen of the user device 112. The UI 540 includes an input field 518 for a PIN associated to the authentication of the payment 126 and the PIN is given by the issuing server 118 during allocation of the payment card 126 to the cardholder 110. The cardholder 110 enters the registered PIN in the input field 518 and clicks on the button 520 labelled as "submit" to submit the PIN. The payment server 114, upon receiving the PIN, sends the PIN to the issuing server 118 for authentication. Upon successful authentication of the PIN from the issuing server 118, another UI 550 is rendered on the display screen of the cardholder 110.

UI 550 shows a notification message 522 on the display screen of the cardholder 110 that reads "Congratulations you have successfully registered for the Pattern-Auth service" and further includes a plurality of options for generation of the password for authentication. The plurality of options are rendered as tick selection input fields comprising a first tick selection input field 524 as "create sequence of alphabets", a second tick selection input field 526 as "create pattern related to a word" and a third tick selection input field 528 as "utter a word". When the cardholder 110 selects any one option out of the three options by ticking on the tick selection input field of respective option, then the payment server 114 renders UIs corresponding to the selected input field. The generation of password using the three options is discussed individually in FIGS. 6-8, respectively.

FIG. 6 is an example representation of a plurality of UIs (620, 630, and 640) which are rendered on the display screen of the user device 112 when the cardholder 110 selects the option 1 "creating a sequence of pattern" (see, UI 550 in FIG. 5). When the cardholder 110 ticks the first option, a UI 620 is rendered on the user device 112 which includes a scratch pad 606 (for example, the scratch pad 108), a counter 602, and a timer clock 604. The cardholder 110 draws the pattern (which is at least one alphabet such as alphabet "V" as shown in the figure) on the scratch pad 606, the counter 602 shows the alphabet being drawn by the cardholder 110 in one column 602a (for example, "V") along with the "n" number of times the alphabet is drawn by the cardholder 110 in another column 602b (for example, "5"), and the timer clock 604 shows the time taken by the cardholder 110 to draw the at least one alphabet 'n' number of times (for example, "00:06"). The cardholder 110 then submits the created sequence of alphabets by clicking on the submit button 608. After the cardholder 110 clicks on the submit button 608, the UI 630 is rendered on the user device 112 for re-creating the password created on the UI 620 for confirmation. The structure of UI 630 is similar to the UI 620. It shall be noted that the re-created password comprises drawing the alphabet "V" 5 times in 00:07 seconds. Therefore, the payment server 114 determines that the password is "drawing alphabet "V" 5 times within 00:06-00:07 seconds" based on pressing of the confirm button "610" by the cardholder 110 for confirming the password. Upon completion of setting up the password on the UI 630, the user device 112 is re-directed to UI 640 which displays a notification message stating "congratulations your pattern is registered "5 times alphabet "V" within 00:06-00:07 seconds" and the cardholder 110 press the confirm button "612" for submitting the password. The submitted password is registered in the payment server 114 for authentication of payment transactions performed by the cardholder 110.

FIG. 7 is an example representation of a plurality of UIs (720, 730, and 740) which are rendered on the display screen of the user device 112 when the cardholder 110 selects the option 2 "pattern related to a word" (see, UI 550 in FIG. 5). When the cardholder 110 ticks the second option, a UI 720 is rendered on the user device 112 which corresponds to a touch keypad 702 with swipe function enabled therein. The cardholder 110 types a word (for example, "CAT" as shown in the figure) by using swiping on the touch keypad 702. The touch keypad 702 shows the hand movement of the cardholder 110 while creating the word "CAT" and shows the different possible word formation based on the hand movement such as "CA", "CAT", "CATY" etc.). The cardholder 110 selects CAT from the different word options "CA", "CAT", "CATY". The selected word "CAT" as well as the pattern created by the hand movement of the cardholder 110 while creating the word are sent to the payment server 114 upon selection of the word "CAT" by the cardholder 110. The payment server 114, upon receiving the selected word and the pattern from the user device 112 via the UI 720, renders another UI 730 on the user device 112 which includes a scratch pad 704 (for example, the scratch pad 108), and a time clock 706. The UI 730 is rendered for receiving the pattern corresponding to the selected word "CAT" from the cardholder 110 for confirmation on the scratch pad 704, and the timer clock 706 shows the time taken by the cardholder 110 to draw the pattern (for example, "00:03"). The cardholder 110 submits the created sequence of alphabets by clicking on the submit button 708. After the cardholder 110 clicks on the submit button 708, the user device 112 is re-directed to UI 740 which displays a notification message 710 and the cardholder 110 press the confirm button "715" for submitting the password. The submitted password is registered in the payment server 114 for authentication of payment transactions performed by the cardholder 110.

FIG. 8 is an example representation of a plurality of UIs (820, 830) which are rendered on the display screen of the user device 112 when the cardholder 110 selects the option 3 "utter a word" (see, UI 550 in FIG. 5). When the cardholder 110 ticks the third option, a UI 820 is rendered on the user device 112 which comprises a microphone 802, a start button 804 labelled as "utter a word" and a time clock 806. The cardholder 110 utters a word (for example, "BATH" as shown in the figure) over the microphone 802. The microphone records the uttered word along with the time taken by the cardholder 110 to utter the word. The uttered word along with the recorded time taken is sent to the payment server 114 and upon receiving the uttered word the payment server 114 determines a corresponding pattern for the word "bath" based on interpreting a design/gesture created by tracing the hand movement required to type "bath" using a touch keypad. Upon determining the corresponding pattern for the word "bath", the payment server 114 redirects the user device 112 to UI 830 which displays a notification message 808 notifying the cardholder 110 about the generated password, and the cardholder 110 press the confirm button "810" for submitting the password. The submitted password is registered in the payment server 114 for authentication of payment transactions performed by the cardholder 110.

Figure 9:
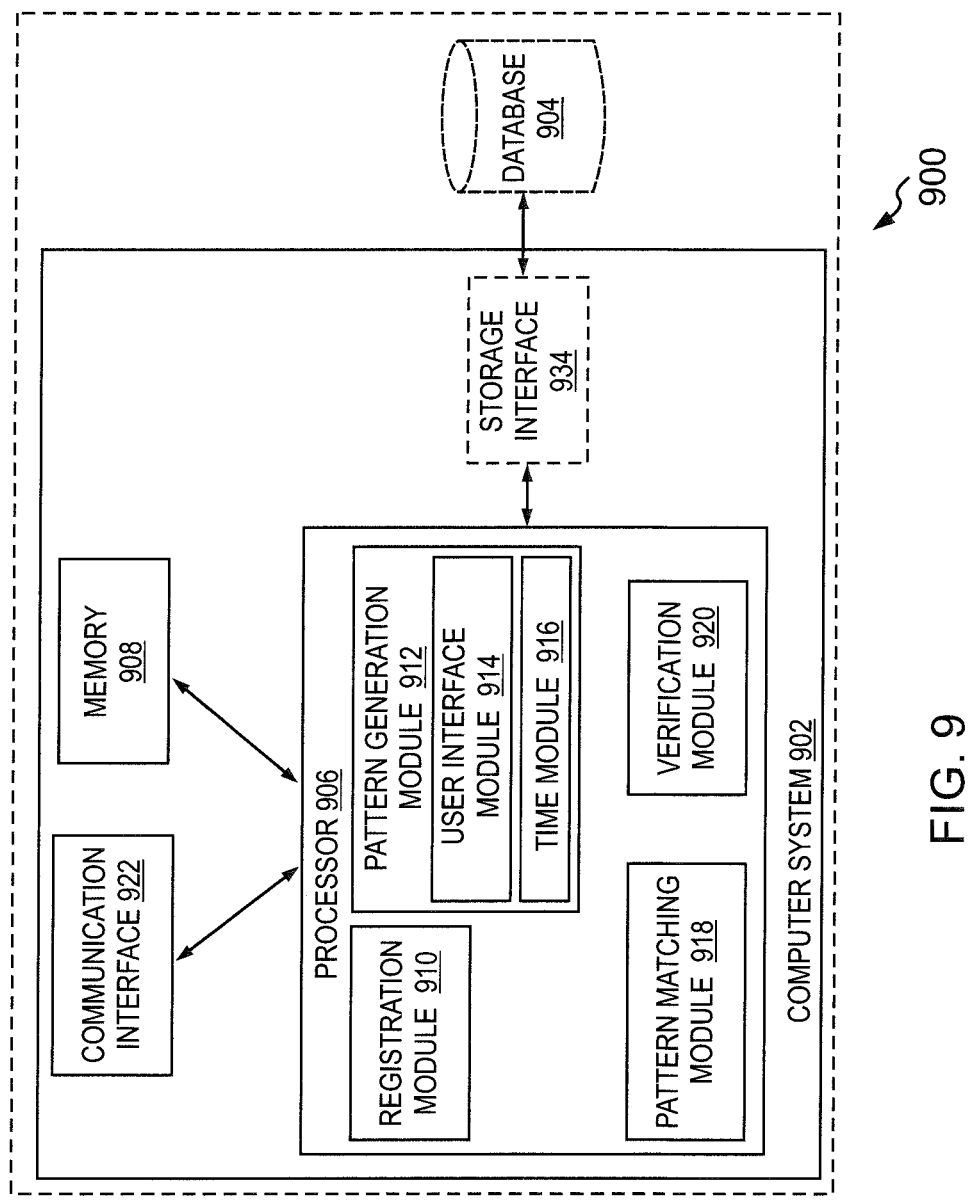
FIG. 9 illustrates a server system for rendering the Pattern-Auth service to the cardholder, in accordance with an embodiment of the present disclosure.

FIG. 9 is a simplified block diagram of a server system 900 for rendering a service (e.g., the Pattern-Auth service) to the cardholder 110, in accordance with an embodiment of the present disclosure. Examples of the server system 900 include, but not limited to, the payment server 114 illustrated in FIG. 1. The server system 900 includes a computer system 902 and a database 904.

The computer system 902 includes at least one processor 906 for executing instructions. Instructions may be stored in, for example, but not limited to, a memory 908. The processor 906 may include one or more processing units (e.g., in a multi-core configuration) such as a registration module 910, a pattern generation module 912 comprising a user interface module 914 and a timer module 916, a pattern matching module 918, and a verification module 920.

The processor 906 is operatively coupled to a communication interface 922 such that the computer system 902 is capable of communicating with a remote device such as a merchant terminal 924 (e.g., the merchant terminal 102), a user device 926 (e.g., the user device 112), an acquiring server 928 (e.g., the acquiring server 116), an issuing server 930 (e.g., the issuing server 118), or communicates with any entity within the network 120. For example, the communication interface 922 may receive a registration request from the user device 926 for registration for a Pattern-Auth service provided by the server system 900. The cardholder 110 can register by accessing a website hosted by the payment server 114 with the payment card 126 and/or a payment transaction request from the merchant terminal 924 for payment of at least a part of a transaction amount of a transaction made the at the merchant terminal 924 by the cardholder 110.

The processor 906 may also be operatively coupled to the database 904. The database 904 is any computer-operated hardware suitable for storing and/or retrieving data, such as, but not limited to, transaction data generated as part of sales activities conducted over the bankcard network including data relating to merchants, account holders or customers, and purchases. The database 904 may also store information related to a plurality of user's issuer accounts. Each user account data includes at least one of a cardholder name, a cardholder address, an account number, sequence of patterns registered the cardholders as passwords under the Pattern-Auth service, a table including PIN of the payment cards mapped against the pattern-based passwords, and other account identifier. The database 904 may also store information of a plurality of merchants, plurality of merchant terminals installed at merchant facilities, such as merchant terminal ID, location of merchant terminals etc. The database 904 may also include instructions for settling transactions including merchant bank account information, determining balance amount to be debited from the issuer account of the cardholder based on transaction amount of transactions made using the Pattern-Auth service. The database 904 may include multiple storage units such as hard disks and/or solid-state disks in a redundant array of inexpensive disks (RAID) configuration. The database 904 may include a storage area network (SAN) and/or a network attached storage (NAS) system. In one embodiment, the communication interface 922 includes a transceiver for wirelessly communicating information to, or receiving information from, the acquiring server 928 or other suitable display device, and/or another type of remote processing device. In another embodiment, the communication interface 922 is capable of facilitating operative communication with the remote devices and a cloud server using Application Program Interface (API) calls. The communication may be achieved over a communication network.

In some embodiments, the database 904 is integrated within the computer system 902. For example, the computer system 902 may include one or more hard disk drives as the database 904. In other embodiments, the database 904 is external to the computer system 902 and may be accessed by the computer system 902 using a storage interface 934. The storage interface 934 is any component capable of providing the processor 906 with access to the database 904. The storage interface 934 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 906 with access to the database 904.

The processor 906 is configured to process a payment transaction performed by the cardholder 110 using the payment card 126 and authenticating the payment transaction Pattern-Auth service. The processor 906 is configured to receive, via the communication interface 922, a registration request for registration for a Pattern-Auth service provided by the server system 900. The processor 906, using the registration module 910, performs registration of the cardholder 110 for the Pattern-Auth service upon receiving the registration request. The registration module 910 receives user details and the card details filled by the cardholder 110 and sends the user details and the card details to the verification module 920 for verification.

The verification module 920, via the communication interface 922, sends a request for verification of payment transaction to the issuing server 930. The issuing server 930 verifies the user details and the card details based on checking its database having all the information registered for each customer such as verifying registered PIN associated with the payment card 126 which is used by the cardholder 110 for performing the payment transaction. The issuing server 930 sends a notification of successful verification to the verification module via the communication interface 922. The verification module 920 notifies the registration module 910 of the successful verification of the user details and the card details. The registration module 910 registers the cardholder 110 for the Pattern-Auth service and provide user-id and password for future access and use. The user details and the card details are stored in either the database 904 or the memory 908.

The processor 906, via the pattern generation module 912, enables the cardholder 110 to create password for authentication under the Pattern-Auth service, the password comprises a sequence of pattern drawn in a time period limit. The pattern generation module 912 renders a plurality if options on the screen of the user device 926 for registration of the password by the cardholder 110.

The pattern generation module 912, using the user interface module, renders a specific user interface on the screen of the user device 926 to receive the sequence of pattern generated by the cardholder 110 based on the selected option by the cardholder 110, the sequence of pattern may corresponds to at least one of a sequence of alphabets, a word or an utterance by the cardholder 110. The pattern generation module 912 further records, using the timer module 916, the time taken by the cardholder 110 to draw the sequence of pattern. The pattern generation module 912 generates the password based on the received sequence of pattern and the recorded time taken, and sends the password to the registration module 910 for registration against the user details and the card details. The registered password is saved in either the database 904 or the memory 908.

In a non-limiting example, the pattern generation module 912 converts each sequence of pattern generated by the cardholder 110 into an encoded pixel matrix. The payment server 114 also monitors the time taken by the cardholder 110 in creating the sequence of pattern and it is stored along with the matrix of the pixel values. The pattern matching module 918 performs matching the password entered by the cardholder 110 for the in-process payment transaction with the pre-registered password during registration.

In a non-limiting example, the pattern matching module 918 converts the received password into a matrix of pixel values based on sensing the hand movement of the cardholder 110 on the user interface. The pattern matching module 918 matches the pixel values in the matrix generated for the received password from the cardholder 110 with the pixel values in the matrix of the pre-registered password. Further the pattern matching module 918 matches the recorded time taken with the pre-recorded time period limit. If the pixels values of both matric are matched with each other and the recorded time taken matched with the pre-recorded time period limit, then the password received from the cardholder 110 is determined to be successfully matched with the pre-registered password.

Thereafter, the processor 906 is configured to process the payment transaction of the transaction amount from the issuer account of the cardholder 110 to the acquirer account of the merchant 102. The processor 906 may also be configured to notify the merchant terminal 924 and/or the user device 926 of the transaction status via the communication interface 922.

Figure 10:
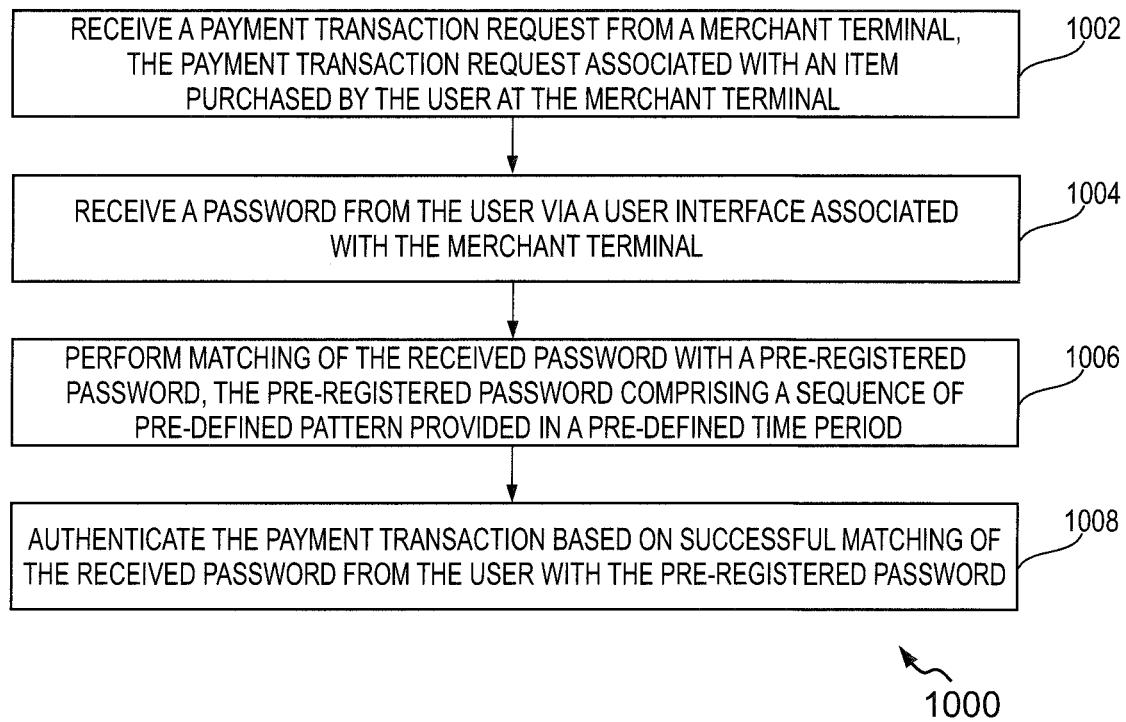
FIG. 10 illustrates a flow diagram representing a method of facilitating registration for a Pattern-Auth service at a service portal, and generation of a pattern based time bound password for authentication of payment transactions, in accordance with an example embodiment of the present disclosure.

FIG. 10 illustrates a flow diagram representing a method 1000 of facilitating registration for a Pattern-Auth service at a service portal 130 and generation of a pattern based time bound password for authentication of payment transactions performed by the cardholder 110, in accordance with an example embodiment.

At step 1002, the method 1000 includes receiving, by the payment server 114, a payment transaction request from the merchant terminal 102, the payment transaction request is associated to an item purchased by the cardholder 110 at the merchant terminal 102. The cardholder 110 has registered with the payment server 114 for the Pattern-Auth service for authentication of the payment transactions performed using a payment card (such as payment card 126) based on pattern-based time bound password which is registered by the cardholder 110.

At step 1004, the method 1000 includes receiving a password from the cardholder 110 via a user interface associated with the merchant terminal 102. The password corresponds to a sequence of pattern drawn within a time period.

At step 1006, the method 1000 includes performing matching of the received password with the pre-registered password. The pre-registered password comprises the sequence of pre-defined pattern drawn in a pre-defined time period.

At step 1008, the method 1000 includes authenticating the payment transaction based on successful matching of the received password from the cardholder 110 with the pre-registered password.

Figure 11:
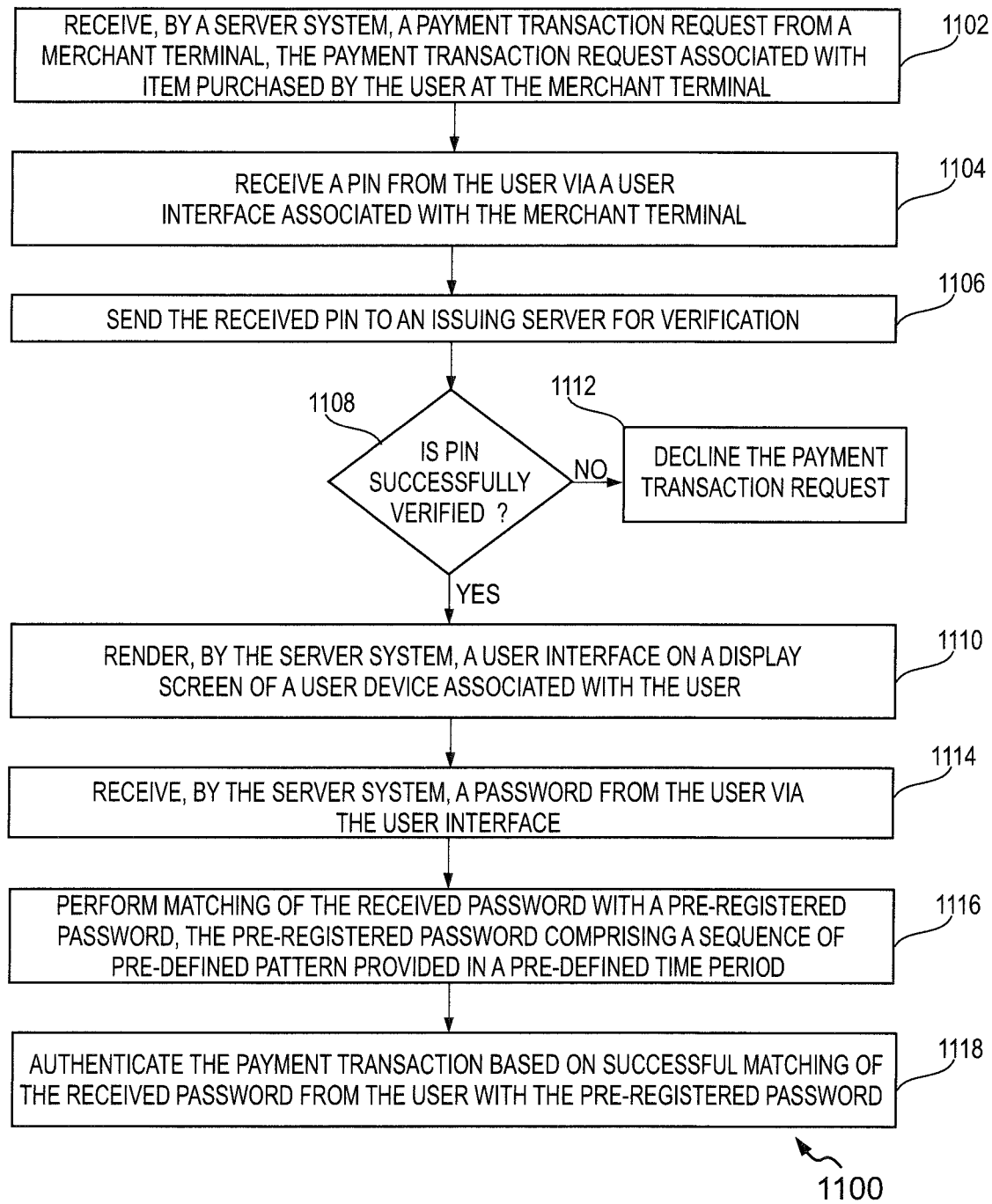
FIG. 11 illustrates another flow diagram representing another method of performing a second level authentication of a payment transaction using the Pattern-Auth service, in accordance with an embodiment of the present disclosure.

FIG. 11 illustrates a flow diagram representing another method 1100 of performing a second level authentication of a payment transaction using the Pattern-Auth service, in accordance with an example embodiment.

At step 1102, the method 1100 includes receiving, by the payment server 114, a payment transaction request from the merchant terminal 102. The payment transaction request is associated to an item purchased by the cardholder 110 at the merchant terminal 102. The cardholder 110 has registered with the payment server 114 for the Pattern-Auth service for authentication of the payment transactions performed using a payment card (such as payment card 126) based on pattern-based time bound password which is registered by the cardholder 110.

At step 1104, the method 1100 includes receiving, by the payment server 114, a personal identification number (PIN) from the cardholder 110 via a user interface associated with the merchant terminal 102.

At step 1106, the method 1100 includes sending, by the payment server 114, the received PIN to an issuing server 118 for verification. The issuing server 118 verifies the PIN based on checking its database having all the information registered for each customer such as registered PIN associated with the payment card 126 which is used by the cardholder 110 for performing the payment transaction. The issuing server 118 matches the received PIN with the registered PIN for verifying the PIN, and sends a notification of successful or unsuccessful verification to the payment server 114.

At step 1108, the method 1100 includes checking if the PIN is successfully verified or not based on the received notification from the issuing server 118. If the PIN is successfully verified the method 1100 proceeds to step 1110 otherwise the method 1100 proceeds to step 1112.

At step 1112, the method 1100 includes declining the payment transaction request and sending a notification to the merchant 102 that the transaction request is decline due to incorrect PIN.

At step 1110, the method 1100 includes rendering, by the payment server 114, a user interface on a display screen of the user device 112 associated with the cardholder 110. The method proceeds to step 1114.

At step 1114, the method 1100 includes receiving a password from the cardholder 110 via the user interface for second-level authentication based on the Pattern-Auth service. The password corresponds to a sequence of pattern drawn within a time period. The method proceeds to step 1116.

At step 1116, the method 1100 includes performing matching of the received password with the pre-registered password. The pre-registered password comprises the sequence of pre-defined pattern drawn in a pre-defined time period. The matching is performed based on pattern matching techniques as discussed in FIG. 1 as well as pattern matching techniques known in the art. The method 1100 proceeds to step 1118.

At step 1118, the method 1100 includes authenticating the payment transaction based on successful matching of the received password from the user with the pre-registered password.

Figure 12:
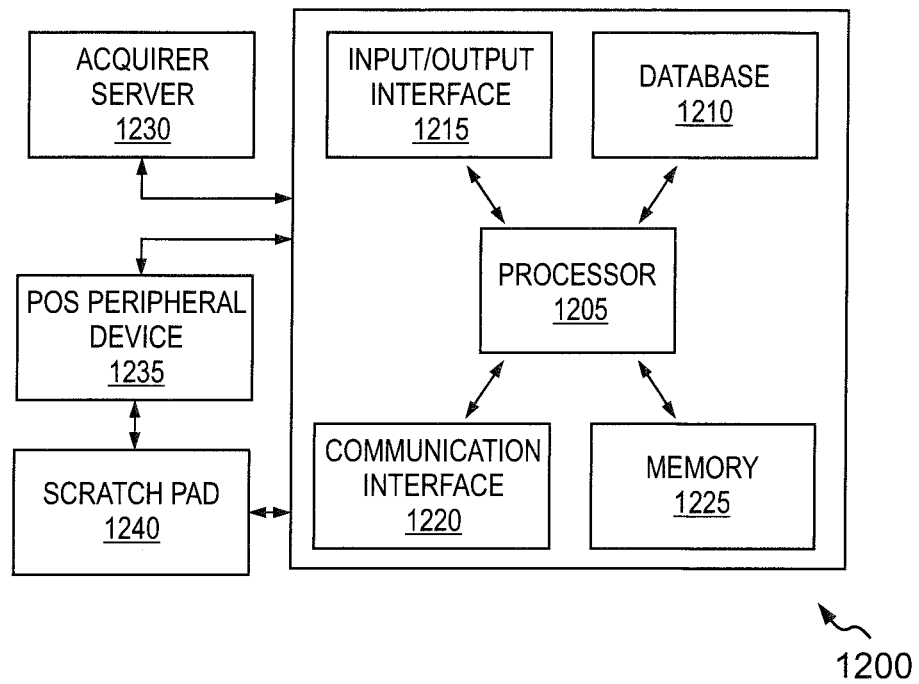
FIG. 12 is a simplified block diagram of a merchant terminal used for card based payment transaction, in accordance with an example embodiment of the present disclosure.

Referring now to FIG. 12, a simplified block diagram of a merchant terminal 1200 such as the merchant terminal 102 used for card based payment transaction, in accordance with one embodiment of the present disclosure. The merchant terminal 1200 as explained herein is only one example of the merchant terminal 102. In various embodiments, the merchant terminal 1200 can be a merchant mobile phone, a kiosk, a PDA, a merchant facilitated e-commerce website interface running on a computing device and the like. The merchant terminal 1200 includes at least one processor 1205 communicably coupled to a database 1210, an Input/Output (I/O) interface 1215, a communication interface 1220 and a memory 1225. The components of the merchant terminal 1200 provided herein may not be exhaustive, and that the merchant terminal 1200 may include more or fewer components than that of depicted in FIG. 12. Further, two or more components may be embodied in one single component, and/or one component may be configured using multiple sub-components to achieve the desired functionalities. Some components of the merchant terminal 1200 may be configured using hardware elements, software elements, firmware elements and/or a combination thereof.

An I/O interface 1215 is configured to receive inputs from and provide outputs to the end-user (i.e. the merchant and/or the customer) of the merchant terminal 1200. For instance, the I/O interface 1215 may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a UI display (such as a light emitting diode display, a thin-film transistor (TFT) display, a liquid crystal display, an active-matrix organic light-emitting diode (AMOLED) display, etc.), a speaker, a ringer, a vibrator, and the like.

The memory 1225 can be any type of storage accessible to the processor 1205. For example, the memory 1225 may include volatile or non-volatile memories, or a combination thereof. In some non-limiting examples, the memory 1225 can be four to sixty four MegaBytes (MB) of Dynamic Random Access Memory ("DRAM") or Static Random Access Memory ("SRAM"). In addition, some examples may include supplementary flash memory installed via a PCMCIA slot.

The database 1210 is capable of storing and/or retrieving data, such as, but not limited to, smart card insertions, user/customer information, merchant information, payment strings uniquely associated with each user, touch-screen key depressions, keypad key depressions, number of dots printed by the slip and roll printers, check read errors, card swipes, such as, plurality of number pad values of the payment card and the like. Such information can be accessed by the processor 1205 using the communication interface 1220 to determine potential future failures and the like.

The merchant terminal 1200 is capable of communicating with one or more POS peripheral devices such as a POS peripheral device 1235 and the scratch pad 1240 (an example of the scratch pad 108 of FIG. 1), and external server system such as an acquiring server 1230 (an example of the acquiring server 116 of FIG. 1) via the communication interface 1220. The POS peripheral device 1235 can provide functionality which is used by a consumer at a merchant facility, such as PIN entry, merchant transaction amount entry, clear text entry, signature capture, and the like. Some non-exhaustive examples of the POS peripheral device 1235 include POS card reader device, barcode scanner, cash drawer, receipt printer, PIN pad, signature capture device, touchscreen, keyboard, portable data terminal, customer pole display and the like. The scratch pad 1240 can provide functionality which is used by a consumer at a merchant facility, such as drawing a pattern, entering a word, or uttering a word which passwords for authentication of the payment transaction. Some non-exhaustive examples of the scratch pad 1240 include digital tablet, virtual touch keypad, virtual microphone, signature capture device, touchscreen, and the like. In some embodiments, the merchant terminal 1200 may be mounted near a cash register at a check-out counter in the merchant facility, while the POS peripheral device 1235 and the scratch pad 1240 may be mounted on the check-out counter such that it is accessible to the users. In this way, both the merchant and the user/customer can interact with similar devices to process the payment transaction.

The communication interface 1220 is further configured to cause display of user interfaces on the merchant terminal 1200. In one embodiment, the communication interface 1220 includes a transceiver for wirelessly communicating information to, or receiving information from, the acquiring server 1230 or other suitable display device, and/or another type of remote processing device. In another embodiment, the communication interface 1220 is capable of facilitating operative communication with the remote devices and a cloud server using Application Program Interface (API) calls. The communication may be achieved over a communication network.

The processor 1205 is capable of sending the transaction request received from the end-user via the communication interface 1220 to the acquiring server 1230 for processing the transaction. For example, the processor 1205 is configured to receive the payment card information of the cardholder 110, PIN, pattern-based password and the transaction amount via the POS peripheral device 1235. The processor 1205 can access the database 1210 to retrieve the user information and merchant information that are required to be sent along with the transaction request to the acquiring server 1230.

Additionally, the merchant terminal 1200 can include an operating system and various software applications that can provide various functionality to the merchant terminal 1200. For example, in some embodiments, the merchant terminal 1200 is addressable with an Internet protocol and includes a browser application. In such embodiments, the processor 1205 includes software adapted to support such functionality. In some embodiments, the processor 1205 executes software to support network management. In particular, this capacity allows software to be downloaded to a plurality of such systems to provide new applications such as application for enabling payment string based payment transactions using POS terminals and/or updates to existing applications. The operating system and software application upgrades are distributed and maintained through communication to the merchant terminal 1200 over the communication network.

Figure 13:
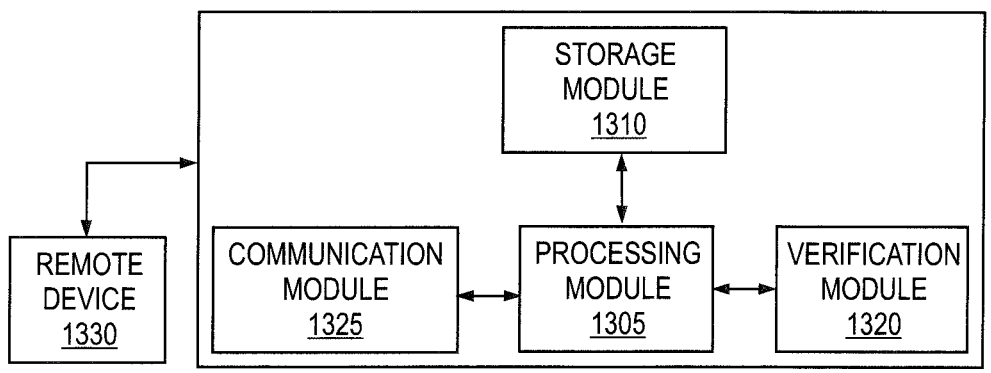
FIG. 13 is a simplified block diagram of an issuing server used for performing payment of at least a part of a transaction amount with a payment card, in accordance with an example embodiment of the present disclosure.

Referring now to FIG. 13, a simplified block diagram of an issuing server 1300, in accordance with one embodiment of the present disclosure. The issuing server 1300 is an example of the issuing server 118 of FIG. 1 or may be embodied in the issuing server 118. The issuing server 1300 is associated with an issuer bank/issuer, in which a cardholder 110 may have an account, which provides a payment card. The issuing server 1300 includes a processing module 1305 operatively coupled to a storage module 1310, a verification module 1320 and a communication module 1325. The components of the issuing server 1300 provided herein may not be exhaustive and that the issuing server 1300 may include more or fewer components than that of depicted in FIG. 13. Further, two or more components may be embodied in one single component, and/or one component may be configured using multiple sub-components to achieve the desired functionalities. Some components of the issuing server 1300 may be configured using hardware elements, software elements, firmware elements and/or a combination thereof.

The storage module 1310 is configured to store machine executable instructions to be accessed by the processing module 1305. Additionally, the storage module 1310 stores information related to, contact information of the customer, bank account number, availability of funds in the account, payment card details, and/or the like. This information is retrieved by the processing module 1305.

The processing module 1305 is configured to communicate with one or more remote devices such as a remote device 1330 using the communication module 1325 over a network such as the network 120 of FIG. 1. The examples of the remote device 1330 include the merchant terminal 102, the payment server 114, the acquiring server 116 and the network 120 and the like. The communication module 1325 is capable of facilitating such operative communication with the remote devices and cloud servers using API (Application Program Interface) calls. The communication module 1325 is configured to receive service request for issuing payment cards provided by the issuing server 1300. The communication module 1325 is configured to receive a transaction clearing amount from the payment server 114 via the network 120. In some example embodiments, the processor 1305 is configured to deduct the transaction clearing amount from payment account of the cardholder 110.

The verification module 1320 is configured to verify and validate a customer (such as the cardholder 110), the payment card 126 associated with the cardholder 110 and a PIN of the payment card 126 for approving the transaction. The verification module 1320 may also verify if an issuer account of the customer associated with the payment card 126 have good standing balance. The communication module 1325 is configured to send notification of approval or decline of a transaction to the merchant terminal 102 via the network 120.

Figure 14:
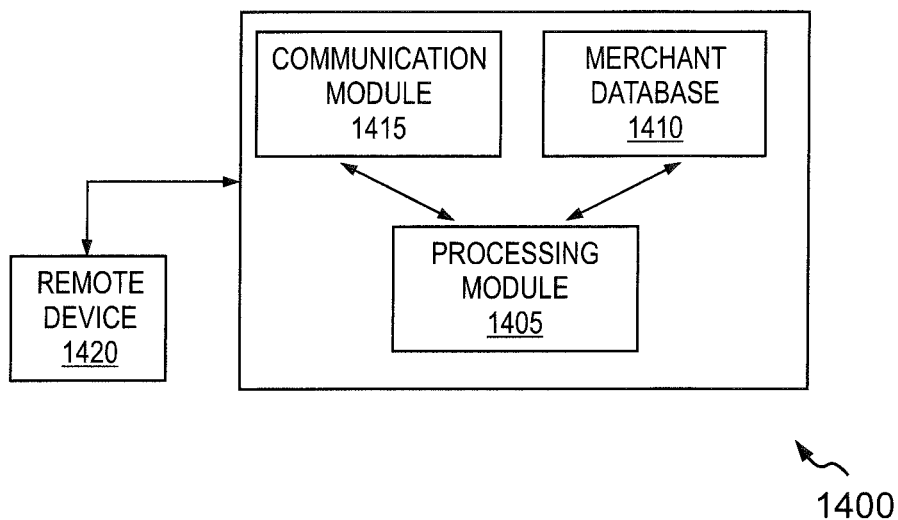
FIG. 14 is a simplified block diagram of an acquiring server used for processing payment transactions at a merchant terminal, in accordance with an example embodiment of the present disclosure.

Referring now to FIG. 14, a simplified block diagram of an acquiring server 1400 used for card based payment transaction, in accordance with one embodiment of the present disclosure. The acquiring server 1400 is associated with an acquirer bank, which may be associated with a merchant (e.g., the merchant facility 102) at whose facility the cardholder 110 is purchasing goods. The merchant may have established an account to accept payment for purchase of goods from customers. The acquiring server 1400 is an example of the acquiring server 116 of FIG. 1 or may be embodied in the acquiring server 116. Further, the acquiring server 1400 is configured to facilitate transaction with the issuing server 1300 using a network, such as the network 120 of FIG. 1. The acquiring server 1400 includes a processing module 1405 communicably coupled to a merchant database 1410 and a communication module 1415. The components of the acquiring server 1400 provided herein may not be exhaustive, and that the acquiring server 1400 may include more or fewer components than that of depicted in FIG. 14. Further, two or more components may be embodied in one single component, and/or one component may be configured using multiple sub-components to achieve the desired functionalities. Some components of the acquiring server 1400 may be configured using hardware elements, software elements, firmware elements and/or a combination thereof.

The merchant database 1410 includes a table which stores one or more merchant parameters, such as, but not limited to, a merchant primary account number (PAN), a merchant name, a merchant ID (MID), a merchant category code (MCC), a merchant city, a merchant postal code, an MAID, a merchant brand name, terminal identification numbers (TIDs) associated with merchant terminals (e.g., the POS terminals or any other merchant electronic devices) used for processing transactions, among others. The processing module 1405 is configured to use the MID or any other merchant parameter such as the merchant PAN to identify the merchant during the normal processing of payment transactions, adjustments, chargebacks, end-of-month fees, loyalty programs associated with the merchant and so forth. The processing module 1405 may be configured to store and update the merchant parameters in the merchant database 1410 for later retrieval. In an embodiment, the communication module 1415 is capable of facilitating operative communication with a remote device 1420.

In some embodiments, the acquiring server 1400 may be configured to communicate with the POS terminal 1435 and the scratch pad 1430 using the communication module 1415.

Figure 15:
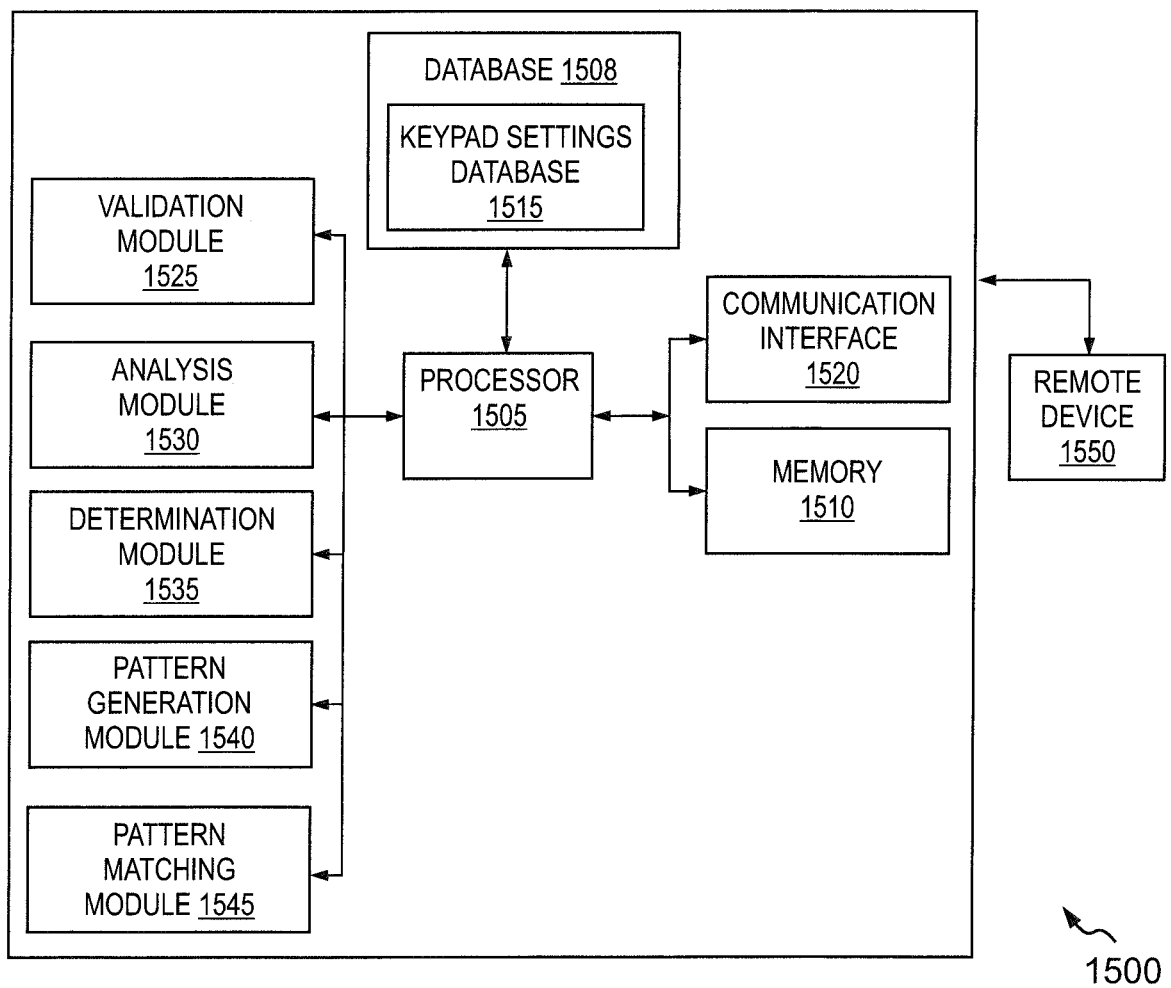
FIG. 15 is a simplified block diagram of a payment server used for providing Pattern-Auth service to the cardholder, in accordance with an example embodiment of the present disclosure.

FIG. 15 is a simplified block diagram of a payment server 1500 used for facilitating authentication of card based payment transaction based on pattern-based time bound password, in accordance with one embodiment of the present disclosure. The payment server 1500 may correspond to the payment server 114 of FIG. 1. The network 120 or a separate payment network (not shown) may be used by the payment server 1500, the issuing server 1300 and the acquiring server 1400 as a payment interchange network. Examples of payment interchange network include, but not limited to, Mastercard® payment system interchange network. The payment server 1500 includes a processor 1505 configured to extract programming instructions from a memory 1510 to provide various features of the present disclosure. The components of the payment server 1500 provided herein may not be exhaustive and that the payment server 1500 may include more or fewer components than that of depicted in FIG. 15. Further, two or more components may be embodied in one single component, and/or one component may be configured using multiple sub-components to achieve the desired functionalities. Some components of the payment server 1500 may be configured using hardware elements, software elements, firmware elements and/or a combination thereof.

Via a communication interface 1520, the processor 1505 receives a transaction request from a remote device 1550 such as the acquiring server 1400 or the merchant terminal 102. The communication may be achieved through API calls, without loss of generality. A keypad settings database 1515 is embodied in a database 1508 of the payment server 1500. The keypad settings database 1515 stores information corresponding to a customized electronic number pad settings of an electronic number pad from a plurality of customers. The keypad settings database 1515 is in operative communication with a validation module 1525, an analysis module 1530, a determination module 1535, a pattern generation module 1540, and a pattern matching module 1545.

The determination module 1535 is configured to receive a plurality of transaction requests associated with a plurality of payment cards 126 via the communication interface 1520. The determination module 1535 is configured to determine whether the transaction is applicable for the Pattern-Auth service and further determines the issuing server (such as the issuing server 118) associated with the payment card 126. The determination module 1535 is further configured to determine mapped PIN of the payment card 126 linked with the pattern-based time bound password. In some embodiments, the analysis module 1530 receives the plurality of transaction requests associated with the plurality of card payment transactions done using the payment card 126 using the Pattern-Auth service via the communication interface 1535.

The pattern generation module 1540 is configured to generate a password which comprises a sequence of patterns drawn within a time period. The pattern generation module 1540 is further configured to convert each sequence of pattern generated by the cardholder 110 into an encoded pixel matrix. The pattern generation module 1540 is further configured to monitor the time taken by the cardholder 110 in creating the sequence of pattern and it is stored along with the matrices of the pixel values.

The pattern matching module 1545 is configured to perform matching of the password entered by the cardholder 110 for the in-process payment transaction with the pre-registered password during registration. In a non-limiting example, the pattern matching module 1545 converts the received password into a matrix of pixel values based on sensing the hand movement (e.g., traces of finger or stylus on touch pad) of the cardholder 110. The pattern matching module 1545 matches the pixel values in the matrix generated for the received password from the cardholder 110 with the pixel values in the matrix of the pre-registered password. Further the pattern matching module 1545 matches the recorded time taken with the pre-recorded time period limit.

The memory 1510 stores details such as Issuer ID, POS ID, country code, acquirer ID, payment card details, acquirer account information, transaction records, merchant account information, and the like. The customer details, the payment card details, the issuer account balance, etc. are validated using the validation module 1530. The validation module 1530 may include one or more predefined rule sets using which the processor 1505 can process the validation. Further, the processor 1505, upon successful validation, sends the transaction amount to the acquiring server 1400.

The processor 1505 is further configured to notify the remote device 1535 of the transaction status via the communication interface 1520. The remote devices, as an example, may be the merchant terminal 102, the merchant interface device 106, the issuing server 118, and the acquiring server 116. In one embodiment, the processor 1505 may facilitate a dedicated software application (also referred to as 'the application interface') capable of being installed on the user device 112. The cardholder 110 may access the application interface for registration and request for the Pattern-Auth service via the user device 112. The cardholder 110 may access the application interface using a web link as well, instead of having a need to install the application on the user device 112.

Figure 16:
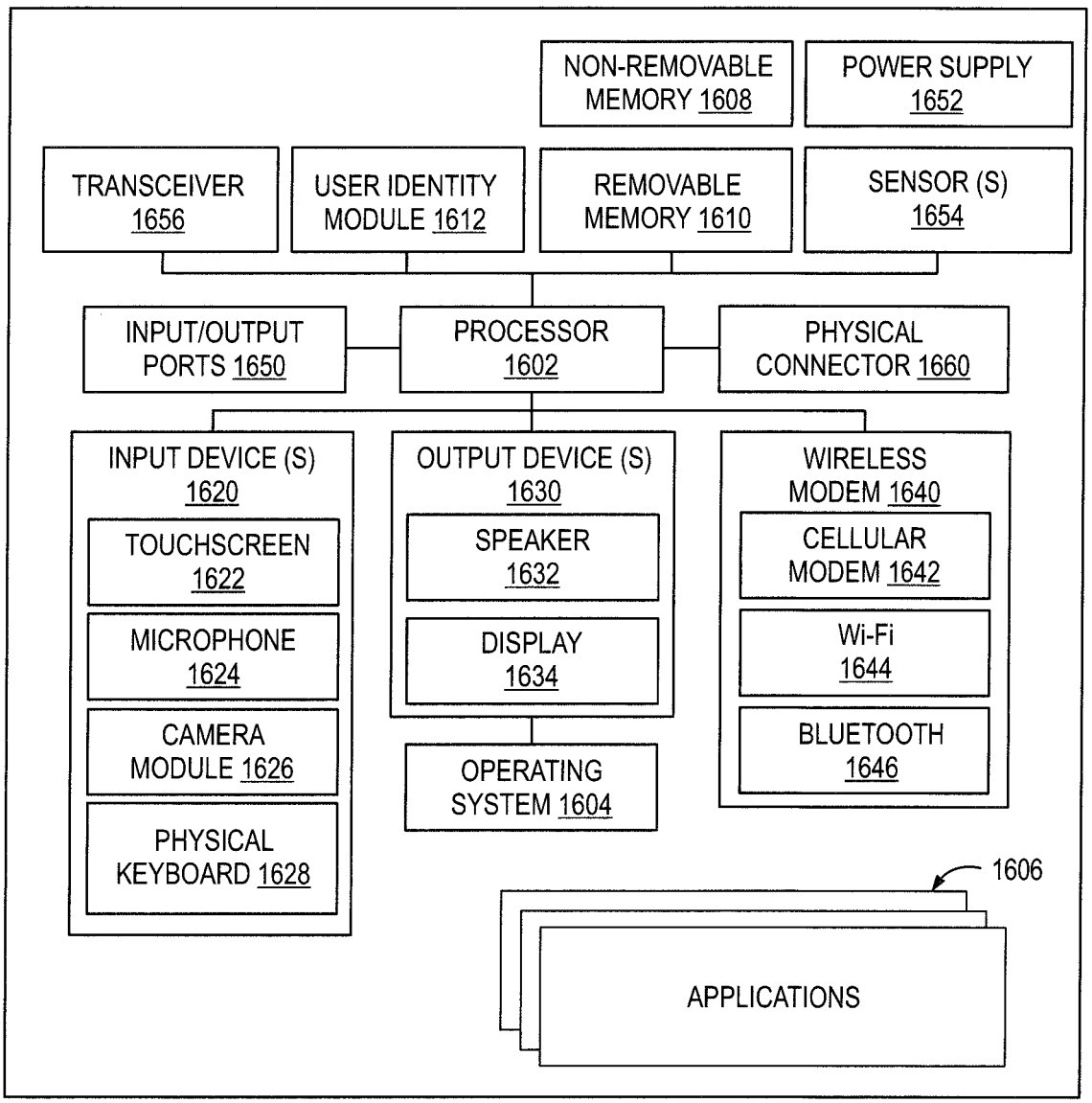
FIG. 16 shows simplified block diagram of an electronic device capable of implementing the various embodiments of the present disclosure.

FIG. 16 shows a simplified block diagram of a user device 1600, for example, a mobile phone or a desktop computer capable of implementing the various embodiments of the present disclosure. For example, the user device 1600 may correspond to the user device 112 of FIG. 1. The user device 1600 is depicted to include one or more applications 1606 related to the present disclosure.

It should be understood that the user device 1600 as illustrated and hereinafter described is merely illustrative of one type of device and should not be taken to limit the scope of the embodiments. As such, it should be appreciated that at least some of the components described below in connection with that the user device 1600 may be optional and thus in an example embodiment may include more, less or different components than those described in connection with the example embodiment of FIG. 16. As such, among other examples, the user device 1600 could be any of an electronic device, for example, cellular phones, tablet computers, laptops, mobile computers, personal digital assistants (PDAs), mobile televisions, mobile digital assistants, or any combination of the aforementioned, and other types of communication or multimedia devices.

The illustrated user device 1600 includes a controller or a processor 1602 (e.g., a signal processor, microprocessor, ASIC, or other control and processing logic circuitry) for performing such tasks as signal coding, data processing, image processing, input/output processing, power control, and/or other functions. An operating system 1604 controls the allocation and usage of the components of the user device 1600 and support for one or more applications programs, that implements one or more of the innovative features described herein. The applications 1606 may include the Pattern-Auth application. Additionally, the applications 1606 may include common mobile computing applications (e.g., telephony applications, email applications, calendars, contact managers, web browsers, messaging applications such as USSD messaging or SMS messaging or SIM Tool Kit (STK) application) or any other computing application.

The illustrated user device 1600 includes one or more memory components, for example, a non-removable memory 1608 and/or a removable memory 1610. The non-removable memory 1608 and/or the removable memory 1610 may be collectively known as database in an embodiment. The non-removable memory 1608 can include RAM, ROM, flash memory, a hard disk, or other well-known memory storage technologies. The removable memory 1610 can include flash memory, smart cards, or a Subscriber Identity Module (SIM). The one or more memory components can be used for storing data and/or code for running the operating system 1604 and the applications 1606. The user device 1600 may further include a user identity module (UIM) 1612. The UIM 1612 may be a memory device having a processor built in. The UIM 1612 may include, for example, a subscriber identity module (SIM), a universal integrated circuit card (UICC), a universal subscriber identity module (USIM), a removable user identity module (R-UIM), or any other smart card. The UIM 1612 typically stores information elements related to a mobile subscriber. The UIM 1612 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The user device 1600 can support one or more input devices 1620 and one or more output devices 1630. Examples of the input devices 1620 may include, but are not limited to, a touch screen/a display screen 1622 (e.g., capable of capturing finger tap inputs, finger gesture inputs, multi-finger tap inputs, multi-finger gesture inputs, or keystroke inputs from a virtual keyboard or keypad), a microphone 1624 (e.g., capable of capturing voice input), a camera module 1626 (e.g., capable of capturing still picture images and/or video images), and a keypad 1628. Examples of the output devices 1630 may include, but are not limited to a speaker 1632 and a display 1634. Other possible output devices can include piezoelectric or other haptic output devices. Some devices can serve more than one input/output function. For example, the touch screen 1622 and the display 1634 can be combined into a single input/output device.

A wireless modem 1640 can be coupled to one or more antennas (not shown in FIG. 16) and can support two-way communications between the processor 1602 and external devices, as is well understood in the art. The wireless modem 1640 is shown generically and can include, for example, a cellular modem 1642 for communicating at long range with the mobile communication network, a Wi-Fi compatible modem 1644 for communicating at short range with an external Bluetooth-equipped device or a local wireless data network or router, and/or a Bluetooth-compatible modem 1646. The wireless modem 1640 is typically configured for communication with one or more cellular networks, such as a GSM network for data and voice communications within a single cellular network, between cellular networks, or between the user device 1600 and a public switched telephone network (PSTN).

The user device 1600 can further include one or more input/output ports 1650 for establishing connection with peripheral devices including the POS terminal 1600, a power supply 1652, one or more sensors 1654 for example, an accelerometer, a gyroscope, a compass, or an infrared proximity sensor for detecting the orientation or motion of the user device 1600 and biometric sensors for scanning biometric identity of an authorized user, a transceiver 1656 (for wirelessly transmitting analog or digital signals) and/or a physical connector 1660, which can be a USB port, IEEE 1294 (FireWire) port, and/or RS-232 port. The illustrated components are not required or all-inclusive, as any of the components shown can be deleted and other components can be added.

Without in any way limiting the scope, interpretation, or application of the claims appearing below, a technical effect of one or more of the example embodiments disclosed herein is to provide methods and systems for facilitating authentication of a payment transaction performed by a cardholder based on a pre-registered pattern-based time bound password. More specifically, the authentication is performed based on the pre-registered password comprising a sequence of patterns formed in a pre-defined time period limit. The embodiments facilitate the payment transaction in a more secure manner by using pattern-based passwords for cardholders registered for the Pattern-Auth service. The process in which the cardholder while performing any transaction, whether online or at POS terminal, provides a pattern on a scratch pad which is only known to the cardholder and is not visible even on the merchant device or the user device eliminates the risk of password stealing and for a person who may be shoulder surfing it will look like the cardholder is scratching the scratch pad or when the cardholder is uttering a word n number of times within pre-defined time period for authentication, the person who is shoulder surfing will not get to know how many times the cardholder said the word and within what time duration. Hence, the present disclosure helps in eliminating the risk of PIN/password theft and makes the process of card-based payments more secure without compromising on the convenience of the cardholder while making the transaction.

The disclosed methods with reference to FIGS. 1 to 16, or one or more operations of the flow diagrams 1000, and 1100 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a clientserver network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Although the disclosure has been described with reference to specific exemplary embodiments, it is noted that various modifications and changes may be made to these embodiments without departing from the broad spirit and scope of the disclosure. For example, the various operations, blocks, etc. described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the server systems (e.g., the servers 114, 116, and 118) and its various components such as the computer system and the database may be enabled using software and/or using transistors, logic gates, and electrical circuits (for example, integrated circuit circuitry such as ASIC circuitry). Various embodiments of the disclosure may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein.

In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the disclosure, as discussed above, may be practiced with steps and/or operations in a different order, and/or with hardware elements in configurations, which are different than those which, are disclosed. Therefore, although the disclosure has been described based upon these exemplary embodiments, it is noted that certain modifications, variations, and alternative constructions may be apparent and well within the spirit and scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A method for secure payment transactions using pattern-based authentication, the method comprising:
   receiving, by a server system, a payment transaction request from a merchant terminal, the payment transaction request associated with an item purchased by a user at the merchant terminal;
   receiving, by the server system, a graphically-drawn, timing-specific, and sequence-specific password entered from the user via a user interface associated with the merchant terminal while a time taken to enter the password is displayed on the user interface, wherein the password being drawn in the user interface is not visible on a display screen;
   performing, by the server system, matching of the received password and the time taken to enter the password respectively with a pre-registered password of a plurality of pre-registered passwords and a pre-defined time period, the pre-registered password being registered by the user for authentication of payment transactions performed by the user, and the pre-registered password comprising a sequence of a pre-defined graphical pattern provided in the pre-defined time period; and
   authenticating, by the server system, the payment transaction based on successful matching of the received password from the user with the pre-registered password and successful matching of the time taken to enter the password by the user with the pre-defined time period.

2. The method of claim 1, further comprising performing registration of the user for availing the pattern-based authentication for secure payment transactions.

3. The method of claim 1, further comprising:
   performing registration of the pre-registered password; and
   providing a plurality of options to the user for registering the pre-registered password.

4. The method of claim 3, wherein the plurality of options comprises drawing an alphabet for a pre-defined number of times in the pre-defined time period.

5. The method of claim 3, wherein the plurality of options comprises typing a word on a touch keypad, and wherein the pre-defined pattern corresponds to a design created by tracing a hand movement of the user while typing the word on the touch keypad in the pre-defined time period.

6. The method of claim 3, wherein the plurality of options comprises uttering a word that is converted to a corresponding graphical pattern by converting an utterance of the word to a typed version of the word, obtaining the graphical pattern by tracing a hand movement of the user for typing the typed version of the word on a touch keypad.

7. The method of claim 1, further comprising generating a matrix of pixel values for the pre-defined pattern of the pre-registered password.

8. The method of claim 7, wherein matching comprises:
converting a pattern received in the password provided by the user into a new matrix of pixel values corresponding to the pattern received in the received password, and
matching the matrix of pixel values for the pre-defined pattern with the new matrix of pixel values corresponding to the pattern received in the password for authentication of the payment transaction.

9. A server system, the system comprising:
a memory that stores instructions; and
a processor that executes the instructions stored in the memory and thereby cause the system to at least:
receive a payment transaction request from a merchant terminal, the payment transaction request associated with an item purchased by a user at the merchant terminal;
receive a graphically-drawn, timing-specific, and sequence-specific password entered from the user via a user interface associated with the merchant terminal while a time taken to enter the password is displayed on the user interface, wherein the password being drawn in the user interface is not visible on a display screen;
perform matching of the received password and the time taken to enter the password respectively with a pre-registered password of a plurality of pre-registered passwords and a pre-defined time period, the pre-registered password being registered by the user for authentication of payment transactions performed by the user, and the pre-registered password comprising a sequence of pre-defined graphical pattern generated in the pre-defined time period; and
authenticate the payment transaction based on successful matching of the received password from the user with the pre-registered password and successful matching of the time taken to enter the password by the user with the pre-defined time period.

10. The server system of claim 9, wherein the processor is further configured to cause the server system to perform registration of the user for availing the pattern-based authentication for secure payment transactions.

11. The server system of claim 10, wherein the processor is further configured to cause the server system to provide a plurality of options to the user for registering the pre-registered password during registration of the user.

12. The server system of claim 11, wherein the plurality of options comprises drawing an alphabet for a pre-defined number of times in the pre-defined time period.

13. The server system of claim 11,
wherein the plurality of options comprises typing a word on a touch keypad rendered on the user interface, and
wherein the pattern corresponds to a design created by tracing a hand movement of the user while typing the word on the touch keypad in the pre-defined time period.

14. The server system of claim 11, wherein the plurality of options comprises uttering a word for a pre-defined number of times in the pre-defined time period for which the pattern is created corresponding to a path racing location of each alphabet of the word on a touch keypad.

15. The method of claim 9, wherein the processor is further configured to cause the server system to generate a matrix of pixel values for the pre-defined pattern of the pre-registered password.

16. The method of claim 15, wherein the processor is further configured to cause the server system to:
convert a pattern received in the password provided by the user into a new matrix of pixel values corresponding to the pattern received in the received password; and
match the matrix of pixel values for the pre-defined pattern with the new matrix of pixel values corresponding to the pattern received in the password for authentication of the payment transaction.

17. A method for secure payment transactions using pattern-based authentication, the method comprising:
receiving, by a server system, a payment transaction request from a merchant terminal, the payment transaction request associated with an item purchased by a user at the merchant terminal;
receiving, by the server system, a personal identification number (PIN) from the user via a user interface associated with the merchant terminal;
sending, by the server system, the received PIN to an issuing server for verification,
wherein the issuing server is associated with an issuing bank in which the user has a payment account, and
wherein the PIN is associated with a payment card which is used ley the user for performing the payment transaction;
upon receiving a successful verification from the issuing server, rendering, by the server system, a user interface on a display screen of a user device associated with the user;
receiving, by the server system, a graphically-drawn, timing-specific, and sequence-specific password entered from the user via the user interface of the user device while a time taken to enter the password is displayed on the user interface, wherein the password being drawn in the user interface is not visible on a display screen;
performing, by the server system, matching of the received password and the time taken to enter the password respectively with a pre-registered password of a plurality of pre-registered passwords and a pre-defined time period, the pre-registered password being registered by the user for a second-level authentication of payment transactions performed by the user, and the pre-registered password comprising a sequence of pre-defined graphical pattern provided in the pre-defined time period; and
authenticating, by the server system, the payment transaction based on successful matching of the received password from the user with the pre-registered password and successful matching of the time taken to enter the password by the user with the pre-defined time period.

18. The method of claim 17, further comprising providing a plurality of options to the user for registering the pre-registered password.

19. The method of claim 18, wherein the plurality of options comprises one of:

drawing an alphabet for a pre-defined number of times in the pre-defined time period;

typing a word on a touch keypad, for which corresponding pattern is created by tracing a hand movement of the user while typing the word on the touch keypad, in the pre-defined time period; and uttering a word, for which a corresponding pattern is created based on interpretation of hand movement of the user for typing the word on the touch keypad, in the pre-defined time period.

20. The method of claim 1, wherein the pre-defined time period is a pre-defined time period range between a minimum time and a maximum time, and the successful matching of the time taken to enter the password with the pre-defined time period is based on the time taken to enter the password being within the pre-defined time period range.

* * * * *